(12) United States Patent
Brailovskiy et al.

(10) Patent No.: US 10,257,542 B1
(45) Date of Patent: Apr. 9, 2019

(54) COMPRESSION ENCODING OF IMAGES

(71) Applicant: Amazon Technologies, Inc., Seattle, WA (US)

(72) Inventors: Ilya Vladimirovich Brailovskiy, Mountain View, CA (US); Ilia Vitsnudel, Even Yehuda (IL); Manuel Rosendo Arana Manzano, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 419 days.

(21) Appl. No.: 14/668,492

(22) Filed: Mar. 25, 2015

(51) Int. Cl.
*H04N 19/86* (2014.01)
*H04N 19/136* (2014.01)

(52) U.S. Cl.
CPC ........... *H04N 19/86* (2014.11); *H04N 19/136* (2014.11)

(58) Field of Classification Search
CPC .. H04N 19/86; H04N 19/136; H04N 13/0055; H04N 13/0033; H04N 19/597; H04N 13/0438; H04N 13/0436; H04N 13/0029; H04N 13/0048; H04N 2213/007; H04N 2213/002; H04N 19/00769; H04N 9/735; G09G 2340/02; G09G 2340/125; G09G 2360/125; G09G 5/02; G09G 5/36; G09G 2360/127; G09G 5/393; G09G 5/363; G09G 2320/0247; G09G 5/399; G09G 5/391; G09G 2320/0276; G09G 2340/0407; G06T 15/005
See application file for complete search history.

(56) References Cited

U.S. PATENT DOCUMENTS

| | | | | |
|---|---|---|---|---|
| 7,411,628 | B2 * | 8/2008 | Tian | G06T 3/4007 345/472 |
| 7,970,206 | B2 * | 6/2011 | Harris | G09G 5/02 382/162 |
| RE43,085 | E * | 1/2012 | Lin | H04N 9/735 348/223.1 |
| 9,363,421 | B1 * | 6/2016 | Russell | H04N 19/86 |
| 2011/0080616 | A1 * | 4/2011 | Yang | G06K 9/0061 358/3.26 |
| 2012/0081385 | A1 * | 4/2012 | Cote | H04N 5/23219 345/589 |
| 2013/0321675 | A1 * | 12/2013 | Cote | H04N 9/64 348/242 |
| 2015/0010286 | A1 * | 1/2015 | Newman | G11B 27/031 386/230 |
| 2016/0360212 | A1 * | 12/2016 | Dai | H04N 19/186 |

* cited by examiner

*Primary Examiner* — Dramos Kalapodas
(74) *Attorney, Agent, or Firm* — Pierce Atwood LLP

(57) ABSTRACT

Devices, systems and methods are disclosed for improving color resolution in YUV subsampled signals. Chrominance data may be subsampled using two different techniques and the two different outputs may be interlaced to improve a resulting color resolution as perceived by a viewer. Luminance data may be adjusted in paired frames to improve the perceived color resolution without affecting the perceived luminance values. High edge areas, including high frequency variations in luminance values, may be adaptively desaturated to improve the perceived color resolution of the resulting output.

20 Claims, 19 Drawing Sheets

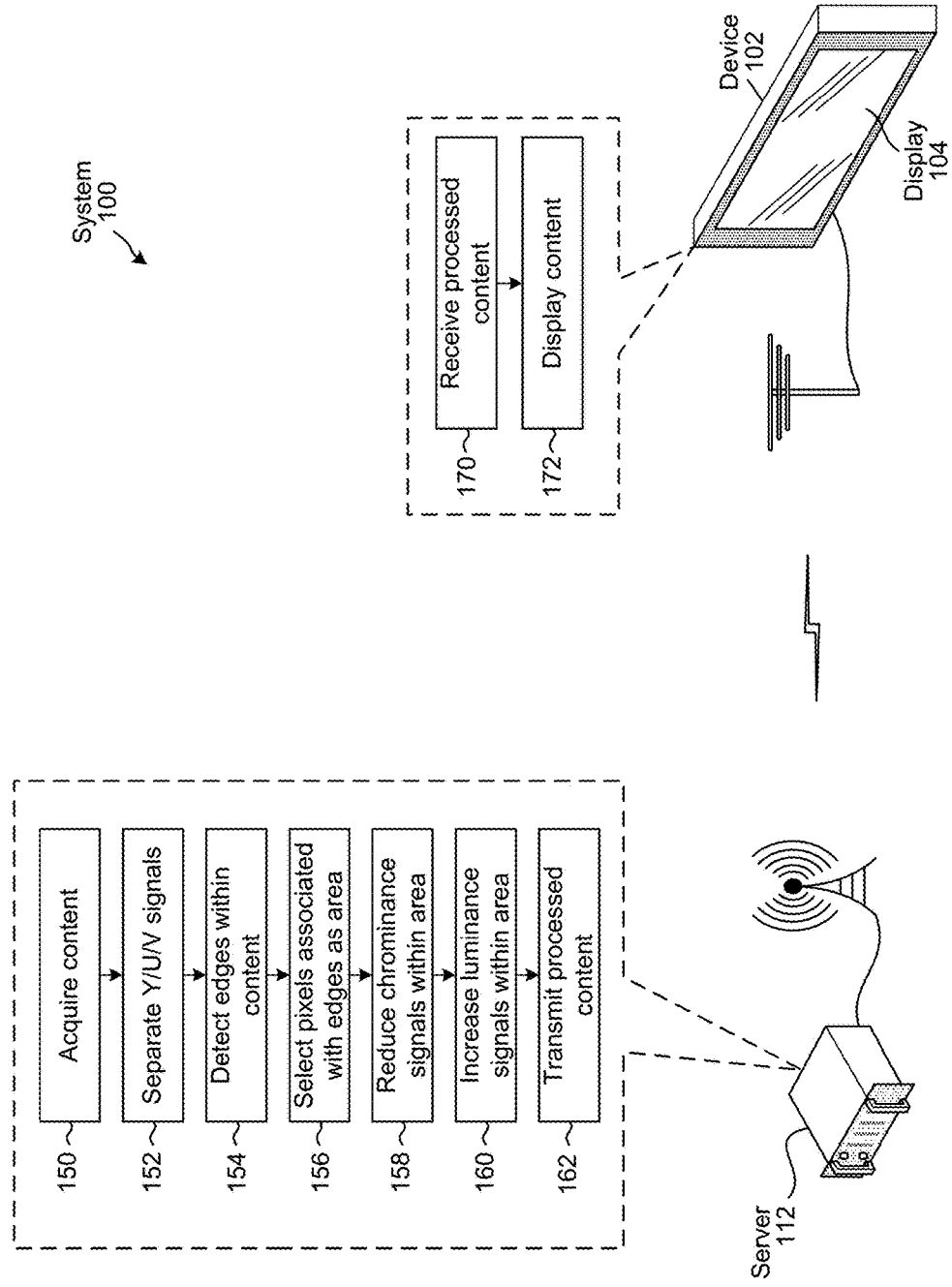

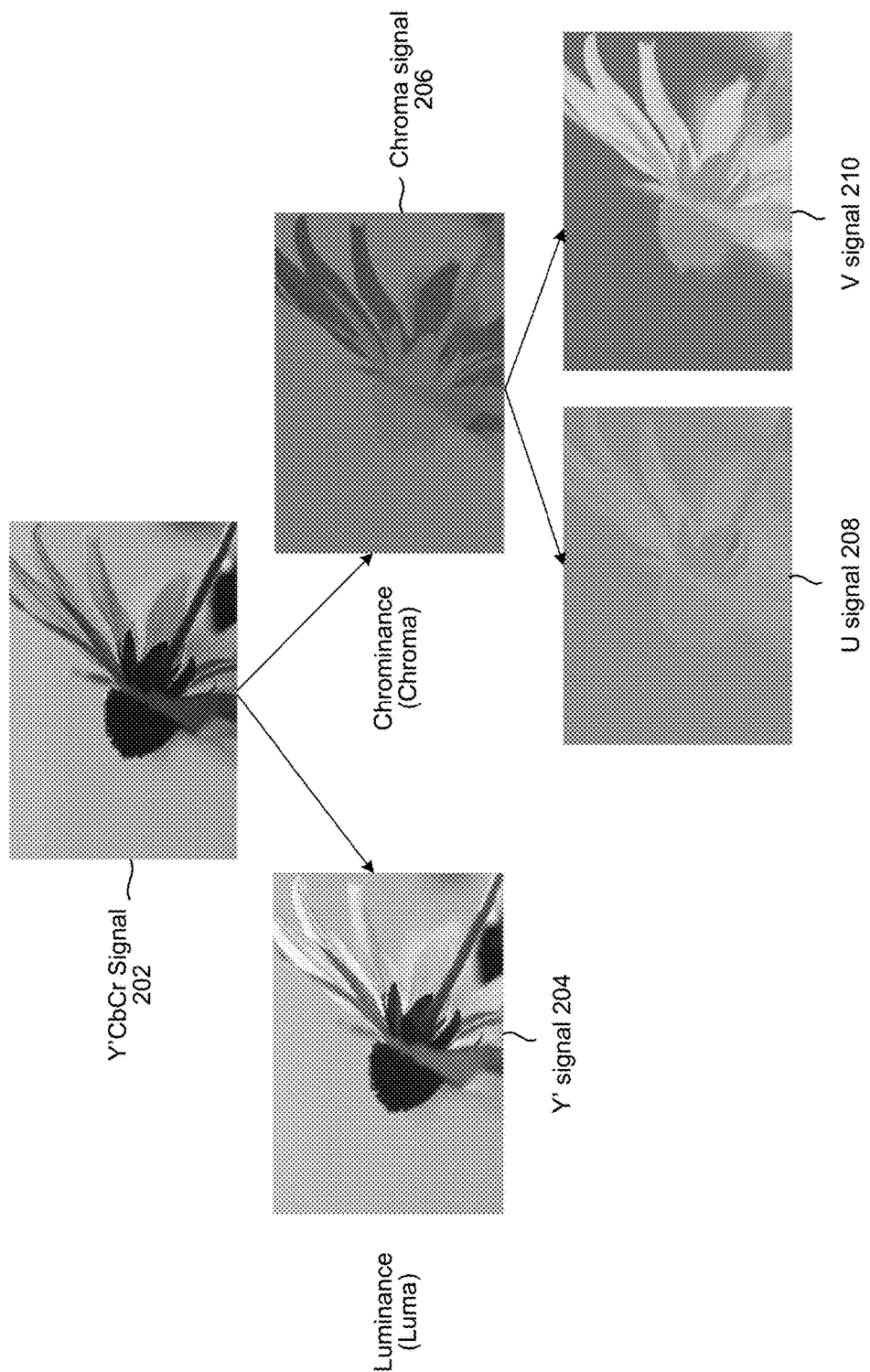

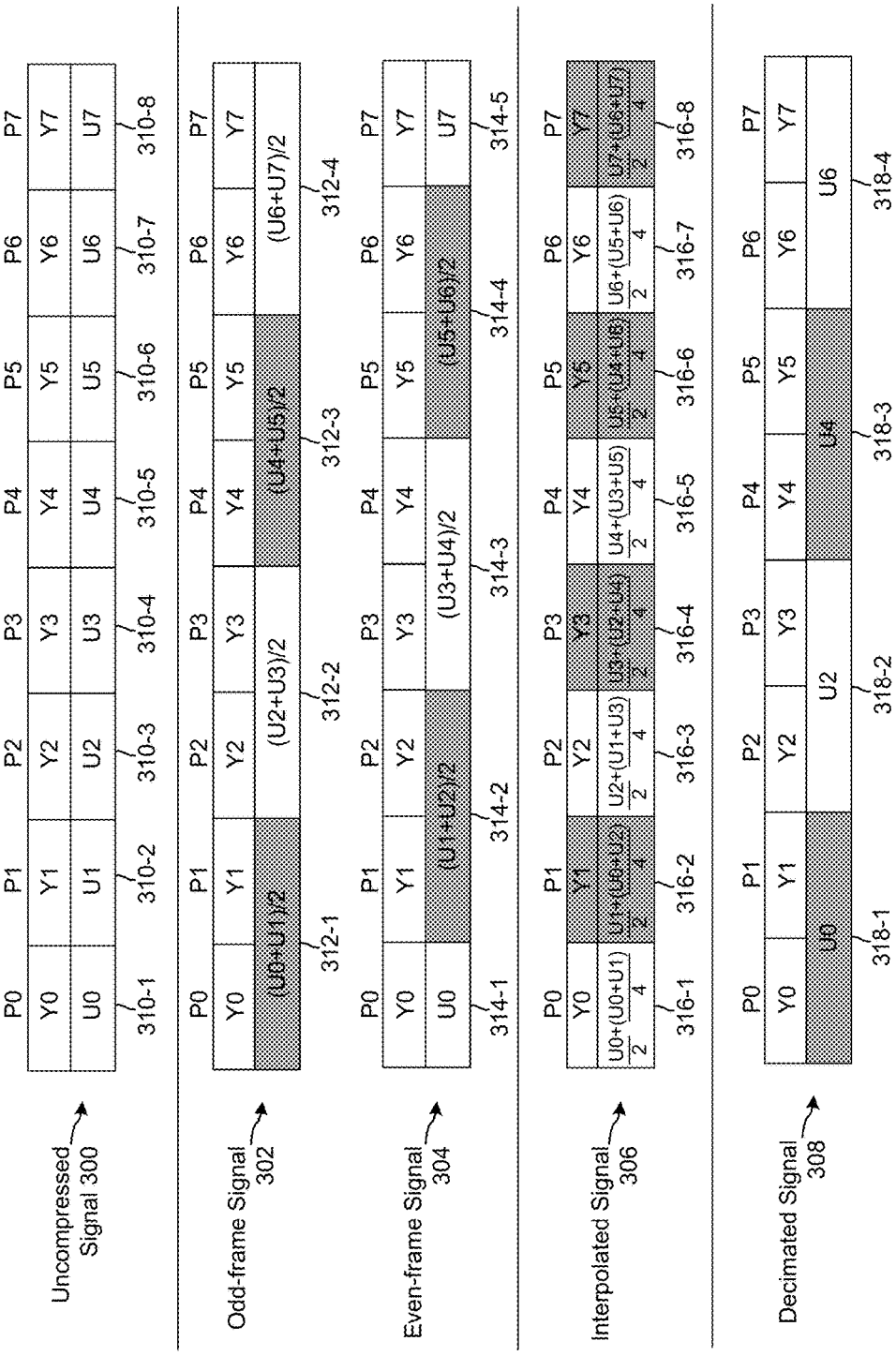

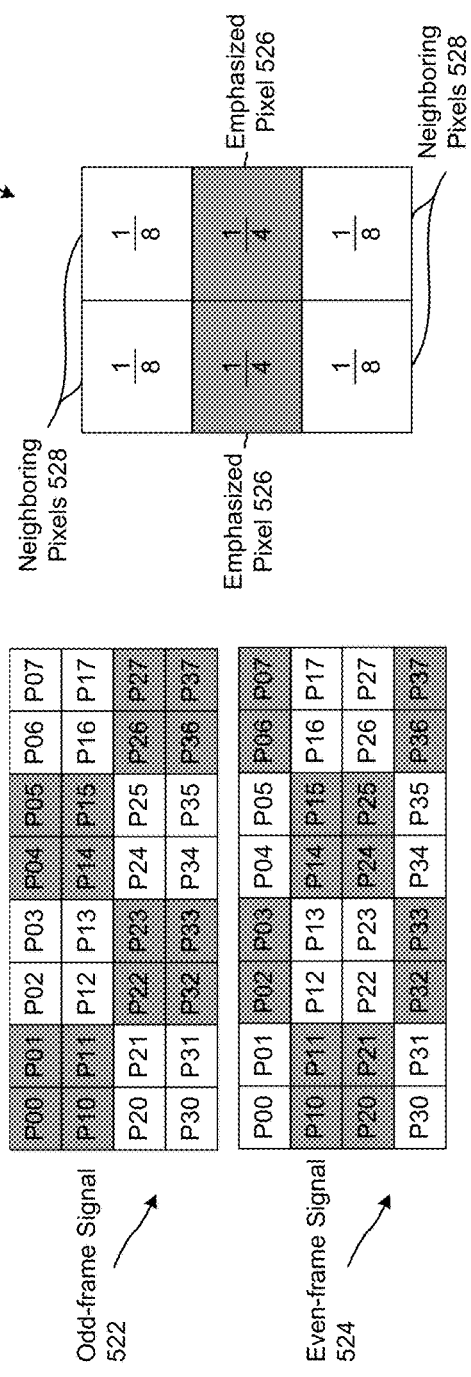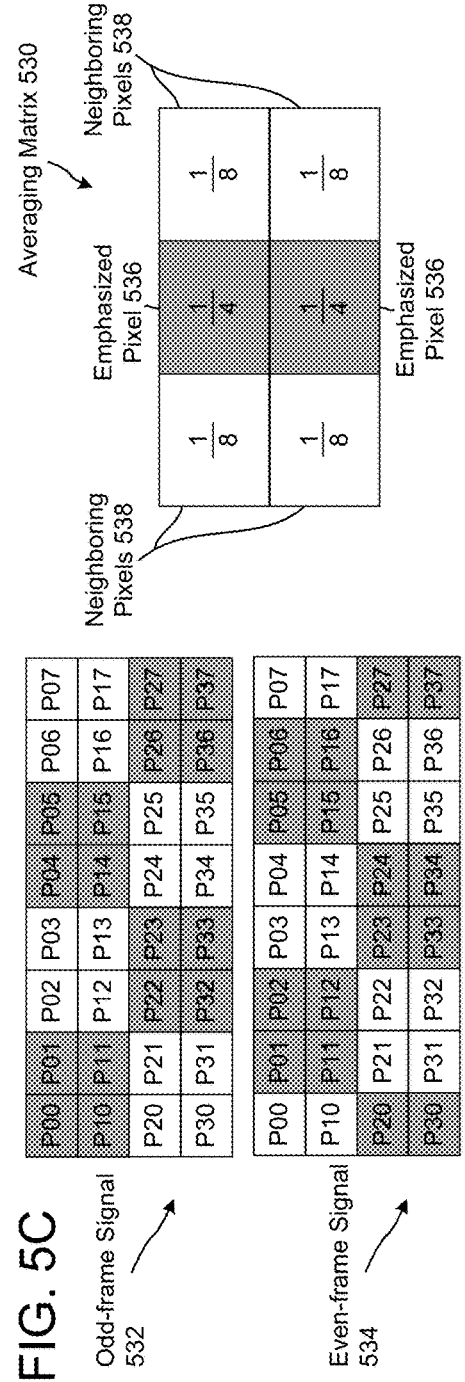

FIG. 9

Uncompressed Signal 900

| | P0 | P1 | P2 | P3 |
|---|---|---|---|---|
| Y signals 902 → | Y0 | Y1 | Y2 | Y3 |
| U signals 904 → | U0 | U1 | U2 | U3 |
| V signals 906 → | V0 | V1 | V2 | V3 |

Odd-frame Signal 910

| | P0 | P1 | P2 | P3 |
|---|---|---|---|---|
| Y signals 912 → | $f_0^{odd}(Y_0^{odd})$ | $f_1^{odd}(Y_1^{odd})$ | $f_2^{odd}(Y_2^{odd})$ | $f_3^{odd}(Y_3^{odd})$ |
| U signals 914 → | (U0+U1)/2 | | (U2+U3)/2 | |
| V signals 916 → | (V0+V1)/2 | | (V2+V3)/2 | |

Even-frame Signal 920

| | P0 | P1 | P2 | P3 |
|---|---|---|---|---|
| Y signals 922 → | $f_0^{evn}(Y_0^{evn})$ | $f_1^{evn}(Y_1^{evn})$ | $f_2^{evn}(Y_2^{evn})$ | $f_3^{evn}(Y_3^{evn})$ |
| U signals 924 → | (U0+U1)/2 | | (U2+U3)/2 | |
| V signals 926 → | (V0+V1)/2 | | (V2+V3)/2 | | where $$f_0^{odd}(Y_0^{odd}) + f_0^{evn}(Y_0^{evn}) = Y_0^{odd} + Y_0^{evn}$$
$$f_1^{odd}(Y_1^{odd}) + f_1^{evn}(Y_1^{evn}) = Y_1^{odd} + Y_1^{evn}$$

Interpolated Signal 930

| | P0 | P1 | P2 | P3 |
|---|---|---|---|---|
| Y signals 932 → | $\frac{Y_0^{odd}+Y_0^{evn}}{2}$ | $\frac{Y_0^{odd}+Y_0^{evn}}{2}$ | $\frac{Y_0^{odd}+Y_0^{evn}}{2}$ | $\frac{Y_0^{odd}+Y_0^{evn}}{2}$ |
| U signals 934 → | (U0+U1)/2 | | (U2+U3)/2 | |
| V signals 936 → | (V0+V1)/2 | | (V2+V3)/2 | |

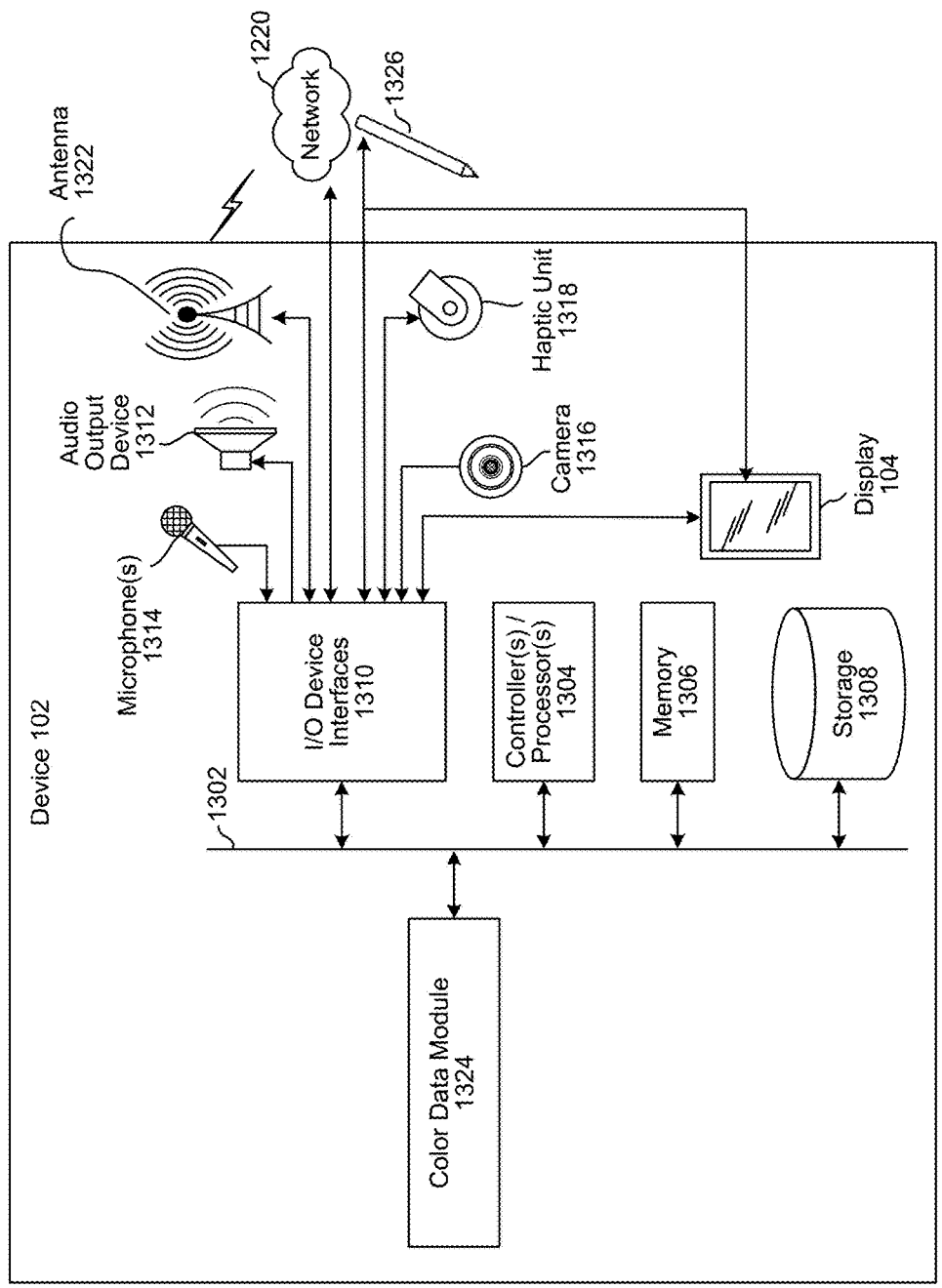

COMPRESSION ENCODING OF IMAGES

BACKGROUND

With the advancement of technology, the use and popularity of electronic devices has increased considerably. Electronic devices are commonly used to display image and video content.

BRIEF DESCRIPTION OF DRAWINGS

For a more complete understanding of the present disclosure, reference is now made to the following description taken in conjunction with the accompanying drawings.

FIGS. 1A-1B illustrate overviews of systems for implementing embodiments of the present disclosure.

FIGS. 2A-2B illustrate examples of luminance and chrominance channels and several chroma subsampling techniques.

FIG. 3 illustrates an example of color data signals when interlacing color data according to embodiments of the present disclosure.

FIGS. 5A-5C illustrate examples of chroma subsampling while interlacing color data according to embodiments of the present disclosure.

FIG. 9 illustrates an example of color data signals when using luminance data for temporal color interlacing according to embodiments of the present disclosure.

FIGS. 13A-13B are block diagram conceptually illustrating example components of a system including one or more of a computing device and a remote server according to embodiments of the present disclosure.

DETAILED DESCRIPTION

Electronic devices are increasingly used to display content, such as images and videos. As a quality of the content increases, a corresponding size of the content or bandwidth required to broadcast or stream the content increases accordingly. Due to storage and transmission limitations, it is beneficial to reduce the size of the content or the bandwidth required to broadcast/stream the content, which may be done by encoding the content. As the human visual system is more sensitive to variations in brightness (e.g., luminance) than color (e.g., chrominance), one technique for reducing the size/bandwidth is to convert an RGB signal to a YUV signal (as explained below) and encode the YUV signal with less resolution for chrominance data (e.g., UN components) than luminance data (e.g., Y components). A common encoding scheme using this technique is known as chroma subsampling.

However, while chroma subsampling may reduce a size/bandwidth of the content without degrading an image quality an appreciable amount, chroma subsampling does result in color distortion when sampling discontinuous chrominance values. Areas with variations in chrominance values, such as edge areas within the content or areas including text, may have an increased amount of color distortion or aliasing of improper colors.

To eliminate or reduce the color distortion resulting from a YUV subsampled signal, devices, systems and methods are disclosed for improving a color resolution of a reconstructed signal using interlacing encoding techniques and/or desaturation of high edge areas. As a first example, chrominance data (e.g., UN components of the YUV signal) may be subsampled using two different subsampling techniques, such as by a first subsampling technique (e.g., YUV422) for odd-frames of content and a second subsampling technique (e.g., YUV422 with an offset) for even-frames of content, where the odd-frames and the even-frames may be interlaced together to improve a resulting color resolution as perceived by a viewer. As a second example, luminance data (e.g., Y components of the YUV signal) may be modified to improve a color resolution of an output RGB signal converted from the YUV signal. For example, as luminance values affect an RGB conversion, matching frames of content (e.g., an odd-frame image and an even-frame image from an image stream such as video content) may be modified such that luminance values are adjusted to improve the RGB conversion of each frame without changing the luminance values of the interlacing frames as perceived by the viewer. As a third example, as human visual systems are less perceptive to colors in areas with high luminance activity (e.g., high edge areas), color distortion may be reduced by adaptively desaturating chrominance values of pixels in high edge areas (i.e., areas of high luminance difference between neighboring pixels), improving the perceived color resolution of the RGB output.

Figure 1A:
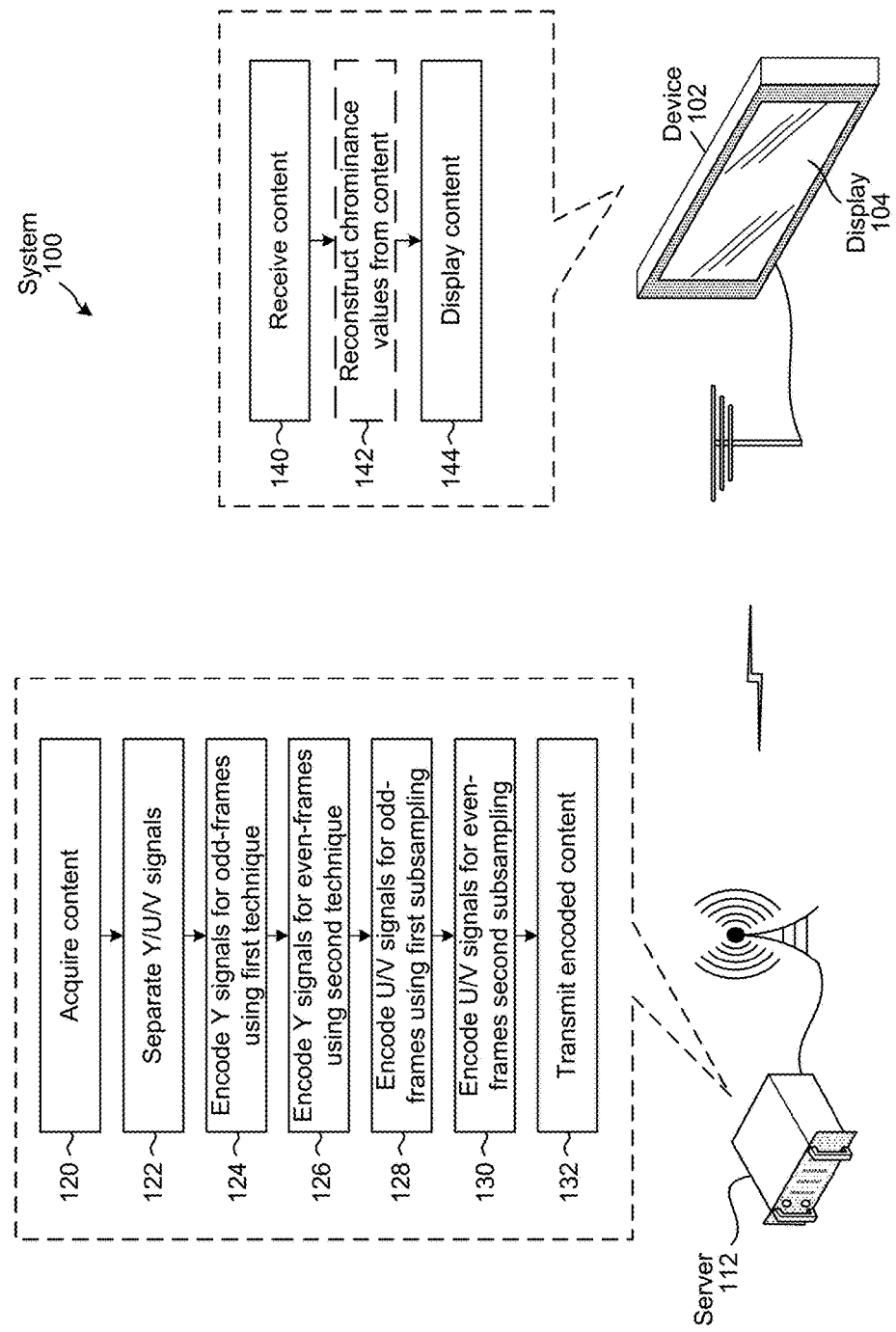

FIG. 1A illustrates an overview of a system 100 for implementing embodiments of the disclosure. The system 100 includes a server 112 and a device 102, such as a television, having a display 104. However, the present disclosure is not limited thereto and the device 102 may be any electronic device including a processor, for example a "headless" device without a build in display that receives image signals and sends them to a separate device for display. As illustrated in FIG. 1A, the server 112 may transmit content to the device 102 to be displayed. Prior to transmitting the content, the server 112 may encode the content using interlacing techniques to improve a color resolution of the content when displayed on the device 102. For ease of explanation the disclosure refers to "interlacing." However, the disclosure is not limited thereto and the server 112 may combine multiple frames using any technique known to one of skill in the art without departing from the present disclosure.

The server 112 may acquire (120) content and may separate (122) Y/U/V signals of the content. For example, if the server 112 acquires the content as an RGB signal, the server 112 may convert the RGB signal to a YUV signal having separate Y/U/V components. The luminance data (e.g., Y components) is calculated using each of the Red, Green and Blue signals, whereas the chrominance data (e.g., U/V components) is calculated using the luminance signal and either the Red signal or the Blue signal. For example, U components may be calculated based on a difference between the Y components and the Blue signals, whereas the V components may be calculated based on a difference between the Y components and the Red signals.

The server 112 may encode (124) Y signals for odd-frames using a first technique and may encode (126) Y signals for even-frames using a second technique, as will be described in greater detail below with regard to FIGS. 8A-10.

The server 112 may encode (128) U/V signals for the odd-frames using a first subsampling technique and may encode (130) U/V signals for the even-frames using a second subsampling technique, as will be described in greater detail below with regard to FIGS. 3-5C.

The server 112 may then transmit (132) the encoded content to the device 102. For example, the server 112 may broadcast the encoded content over the air or via a cable network, may stream the encoded content over the internet or may transmit data to the device 102 as a file.

The device 102 may receive (140) the content from the server 112, may optionally reconstruct (142) chrominance values from the content and may display (144) the content. For example, the device 102 may receive encoded content and may perform typical decoding steps known in the art using a standard decoder to convert the YUV signal to a RGB signal to be displayed on the display 104. Therefore, an encoder in the server 112 may improve a color resolution of the content when displayed on the device 102 even if the device 102 is using a standard decoder and other general equipment included in existing televisions. In some examples, the device 102 may reconstruct original chrominance values from the content, as described in greater detail below with regard to FIGS. 6-7. However, the disclosure is not limited thereto and the interlaced content may improve a color resolution when displayed on the display 104 without the device 102 performing step 142.

FIG. 1B illustrates an overview of the system 100 for implementing embodiments of the disclosure. The system 100 includes the server 112 and the device 102 and the server 112 may transmit content to the device 102 to be displayed, as discussed above with regard to FIG. 1A. Prior to transmitting the content, the server 112 may adaptively desaturate chrominance values of pixels in high edge areas. Alternatively, the device 102 may receive content from the server 112 and may adaptively desaturated chrominance values of pixels in high edge areas without departing from the present disclosure.

The server 112 may acquire (150) content and may separate (152) Y/U/V signals of the content. For example, if the server 112 acquires the content as an RGB signal, the server 112 may convert the RGB signal to a YUV signal having separate Y/U/V components.

The server 112 may detect (154) edges within the content, may select (156) pixels associated with the edges as an area, may reduce (158) chrominance signals within the area and may increase (160) luminance signals within the area, as will be described in greater detail below with regard to FIGS. 11A-11B.

The server 112 may then transmit (162) the processed content to the device 102, and the device 102 may receive (170) the processed content and may display (172) the processed content. Therefore, an encoder in the server 112 may improve a color resolution of the content when displayed on the device 102 even if the device 102 is using a standard decoder and other general equipment included in existing televisions. As a result of the desaturation of chrominance signals within the high-edge areas of the content, a color resolution of the displayed content may be improved.

While FIG. 1B illustrates the server 112 performing steps 154-160, the device 102 may perform one or more of steps 154-160 without departing from the present disclosure. Similarly, the server 112 may perform steps 120-132 in addition to the server 112 or the device 102 performing steps 154-160 without departing from the disclosure.

A luminance component of an image (e.g., black-and-white or achromatic portion of the image) includes the brightness information of the image, whereas the chrominance components (chromatic portion of the image) include the color information. An example of an image displayed in a Y'UV color space is shown in FIG. 2A as YCrCb signal 202. The Y'UV model defines a color space in terms of one luma (Y'), illustrated by Y' signal 204, and two chrominance (UV) components, illustrated as a combination by chroma signal 206 and as separate signals by U signal 208 and V signal 210. Sometimes luminance (Y) refers to perceptual brightness while luma (Y') refers to electronic brightness (e.g., voltage of display) and the terms imply a specific usage. However, for ease of explanation the present disclosure may use the terms "luminance" and "luma" interchangeably to refer to the brightness component (Y or Y') of a YUV signal, while the terms "chrominance" or "chroma" may be used interchangeably to refer to the color information (U and V) included in the YUV signal. Similarly, "YUV" will be used to generally refer to the YUV color space, Y'UV color space and/or file formats that are encoded using YCbCr, which is a family of color spaces in the YUV model.

As a quality of digital and analog content (e.g., image data or video data) increases, a corresponding size of the content or bandwidth required to broadcast or stream the content increases accordingly. Due to storage and transmission limitations, it is beneficial to reduce the size of the content or the bandwidth required to stream the content, which may be done using encoding and/or compression techniques. As the human visual system is much more sensitive to variations in brightness (luminance) than color (chrominance), one technique is to encode the content with less resolution for chrominance data than for luminance data. A common encoding scheme using this technique is known as chroma subsampling, which includes a number of different subsampling schemes (e.g., YUV422, YUV420, YUV411, or the like) that decrease the chrominance data relative to the luminance data in differing ratios.

Figure 2B:
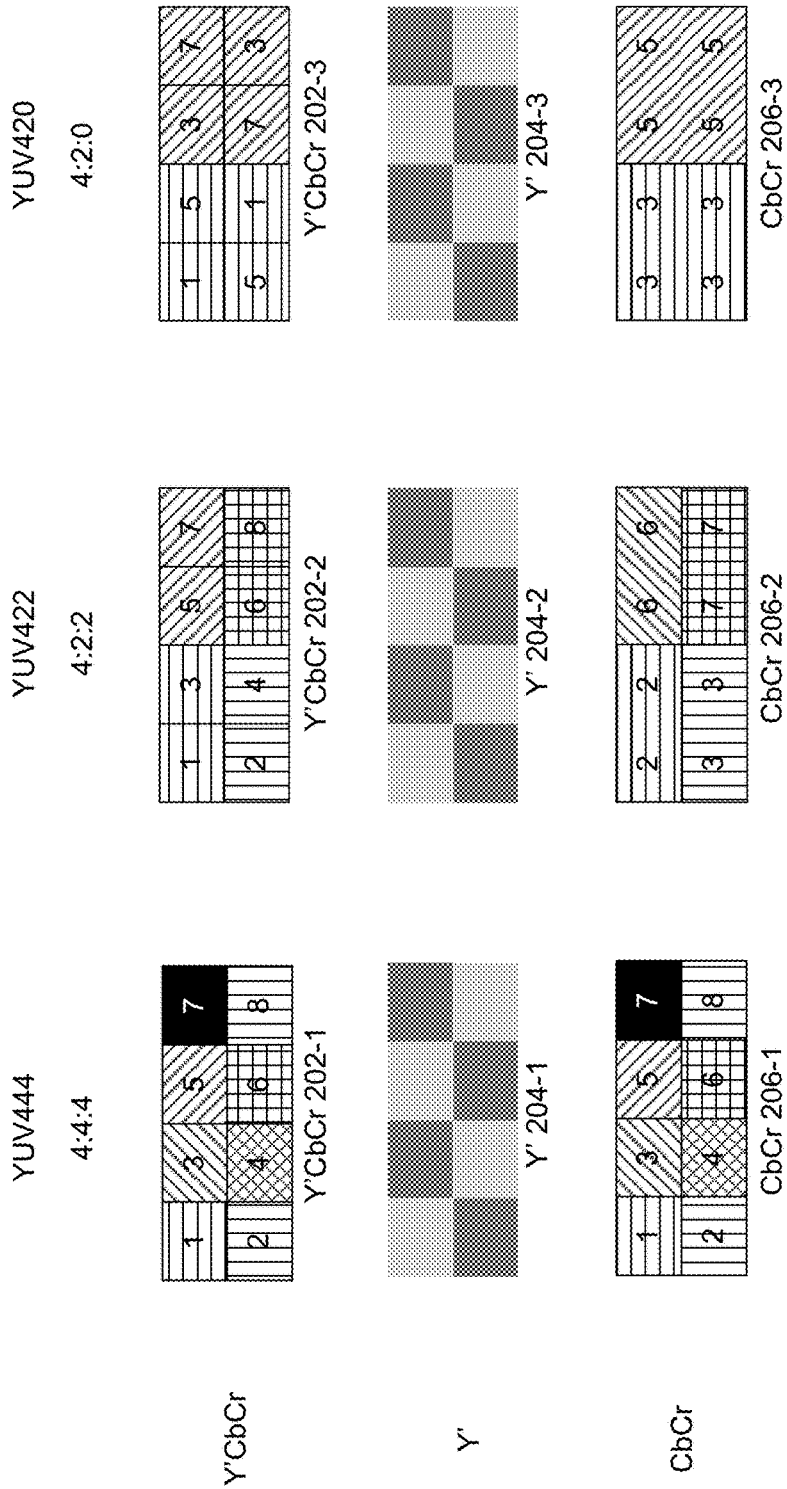

FIG. 2B illustrates several subsampling schemes. YUV444 samples YUV components in a 4:4:4 ratio without reducing color resolution. As illustrated in FIG. 2B, a signal such as first Y'CbCr 202-1 includes 8 separate pixels and can be encoded as first Y' 204-1, which includes 8 luminance samples, and first CbCr 206-1, which includes 8 chrominance samples. In contrast, YUV422 samples YUV components in a 4:2:2 ratio. For example, second Y'CbCr 202-2 includes 8 separate pixels and can be encoded as second Y' 204-2, which includes 8 luminance samples, and second CbCr 206-2, which includes only 4 chrominance samples. Thus, YUV422 samples the two chroma components at half the sample rate of the luma component, resulting in half the horizontal resolution but full vertical resolution for the chrominance data, with the 8 pixels sampled as four blocks of 2 pixels. Similarly, YUV420 samples YUV components in a 4:2:0 ratio. For example, third Y'CbCr 202-3 includes 8 separate pixels and can be encoded as third Y' 204-3, which includes 8 luminance samples, and third CbCr 206-3, which includes only 2 chrominance samples. Thus, YUV420 samples the two chroma components at a quarter the sample rate of the luma component, resulting in half the horizontal resolution and half the vertical resolution for the chrominance data, with 8 pixels sampled as two squares of 4 pixels.

The current subsampling techniques uniformly sample pixels for all frames of the content. For example, YUV422 encoding may use the sampling map illustrated in FIG. 2B for every frame, grouping a first pixel and a second pixel together regardless of differences between them. Thus, a first color value of the first pixel and a second color value of the second pixel are averaged to a third color value that is broadcast for both the first pixel and the second pixel. While this subsampling method achieves bandwidth reductions of about a third with little to no visual difference, the first color value of the first pixel may be drastically different than the second color value of the second pixel, such that the third color value is different than both the first color value and the second color value. This may result in degradation of the color resolution for the content as the two separate pixels are simplified into a single color value, bleeding the two colors together.

To improve color resolution of content compressed using chroma subsampling, the server 112 may encode color data using a first technique for odd-frames and a second technique for even-frames. For example, the first technique may be identical to the YUV422 subsampling described above and the second technique may offset the YUV422 subsampling by a pixel. Thus, odd-frames may sample the first pixel and the second pixel, while even-frames may sample the second pixel and the third pixel. The resulting content may be interlaced to alternate displaying the odd-frames, using the first technique, and the even-frames, using the second technique, so that a viewer's visual system averages color values resulting from display of images using the two techniques.

FIG. 3 illustrates an example of color data signals when interlacing color data according to embodiments of the present disclosure. For ease of explanation, FIG. 3 only illustrates the U component of the chrominance, but the disclosure is not limited thereto and the V component of the chrominance may be modified similarly. The server 112 may receive an uncompressed signal 300, which is illustrated as eight pixels (e.g., P0 to P7) having eight luminance values (e.g., Y0 to Y7) and eight chrominance values (e.g., U0 to U7). The chrominance values may be sampled individually by samples 310-1 through 310-8. For ease of explanation, as used herein a pixel (e.g., P0) may refer to a specific pixel location having various attributes (e.g., luminance values such as Y0, chrominance values such as U0 and/or V0, RGB values such as RGB0 or R0, G0 and B0, or the like) associated with the specific pixel location. Thus, the first pixel (e.g., P0) corresponds to a first pixel location, the second pixel (e.g., P1) corresponds to a second pixel location and the eight pixel (e.g., P7) corresponds to an eighth pixel location.

For odd-frames, the server 112 may encode the uncompressed signal 300 using a YUV422 scheme, sampling the luminance (e.g., Y0 to Y7) individually and sampling the chrominance (e.g., U0 to U7) at half horizontal resolution with no offset. For example, the odd-frame signal 302 includes four samples for the chrominance, 312-1 through 312-4. The first chrominance sample 312-1 averages the first pixel and the second pixel (e.g., (U0+U1)/2), the second chrominance sample 312-2 averages the third pixel and the fourth pixel (e.g., (U2+U3)/2), the third chrominance sample 312-3 averages the fifth pixel and the sixth pixel (e.g., (U4+U5)/2) and the fourth chrominance sample 312-4 averages the seventh pixel and the eight pixel (e.g., (U6+U7)/2).

For even-frames, the server 112 may encode the uncompressed signal 300 using the YUV422 scheme, sampling the luminance individually and sampling the chrominance at half horizontal resolution with an offset of one pixel. For example, the even-frame signal 304 includes five samples for the chrominance, 314-1 through 314-5. The first chrominance sample 314-1 includes the chrominance for the first pixel (e.g., U0), the second chrominance sample 314-2 averages the second pixel and the third pixel (e.g., (U1+U2)/2), the third chrominance sample 314-3 averages the fourth pixel and the fifth pixel (e.g., (U3+U4)/2), the fourth chrominance sample 314-4 averages the sixth pixel and the seventh pixel (e.g., (U5+U6)/2) and the fifth chrominance sample 314-5 includes the chrominance for the eight pixel (e.g., U7). Alternatively, the even-frame signal 304 may include three samples for the chrominance, omitting the first chrominance sample 314-1 and the fifth chrominance sample 314-5.

As the server 112 interlaces the odd-frame signal 302 with the even-frame signal 304, the resulting color data may be summed as interpolated signal 306. As illustrated in FIG. 3, the interpolated signal 306 may include eight separate chrominance components, one for each pixel, with each chrominance component including the original chrominance value for the pixel along with an average of the chrominance values for two horizontally neighboring pixels. For the first pixel P0 and the eighth pixel P7, the average of the chrominance values for two neighboring pixels includes the first chrominance value U0 and the eight chrominance value U7, respectively. For example, the first chrominance sample 316-1 includes the first chrominance value U0 and an average of neighboring pixels (e.g., (U0)/2+(U0+U1)/4), the second chrominance sample 316-2 includes the second chrominance value U1 and an average of horizontally neighboring pixels (e.g., (U1)/2+(U0+U2)/4), the third chrominance sample 316-3 includes the third chrominance value U2 and an average of horizontally neighboring pixels (e.g., (U2)/2+(U1+U3)/4), and so on.

There are at least two improvements to the color resolution that result from interlacing the odd-frame signal 302 and the even-frame signal 304. First, in contrast to the non-interlacing technique, the chrominance is calculated using both horizontally neighboring pixels, centering the chrominance calculation on each pixel. Thus, whereas the non-interlaced technique averaged each chrominance value in only a single direction, the interlaced technique averages each chrominance value in both directions. Second, the original chrominance value for each pixel in the interlaced technique is a dominant signal as it is weighted more heavily than chrominance values of the neighboring pixels. For example, in the non-interlaced technique the original chrominance value for each pixel is weighted equally to a chrominance value of one neighboring pixel, while the chrominance value of the other neighboring pixel is ignored. In contrast, the interlaced technique weights the original chrominance value for each pixel twice that of the neighboring pixels, lessening a negative impact caused when a chrominance value of one of the neighboring pixels is different.

As discussed above with regard to FIG. 2B, current subsampling techniques uniformly sample pixels for all frames of the content. Thus, current methods of YUV subsampling use a static encoding algorithm without interlacing. For example, a YUV422 subsampling technique may average two neighboring pixels in every frame of the content, similar to the odd-frame signal 302 illustrated in FIG. 3. Alternatively, instead of subsampling the chrominance data, some compression techniques may downsample the chrominance data. As an example of downsampling, decimation may be performed on the chrominance data. Decimation is a process of reducing chrominance data by removing every other chrominance value (e.g., removing chrominance values U1, U3, U5, U7), as illustrated in decimated signal 308. For example, the decimated signal 308 includes four samples for the chrominance data, 318-1 through 318-4. The first chrominance sample 318-1 is a chrominance value for the first pixel (e.g., U0), the second chrominance sample 318-2 is a chrominance value for the third pixel (e.g., U2), the third chrominance sample 318-3 is a chrominance value for the fifth pixel (e.g., U4) and the fourth chrominance sample 318-4 is a chrominance value for the seventh pixel (e.g., U6). As illustrated in FIG. 3, downsampling the chrominance data results in less chrominance information than performing static subsampling (e.g., only encoding using odd-frame signal 302) or performing interlaced subsampling (e.g., encoding using odd-frame signal 302 and even-frame signal 304, resulting in the interpolated signal 306).

Figure 4A:
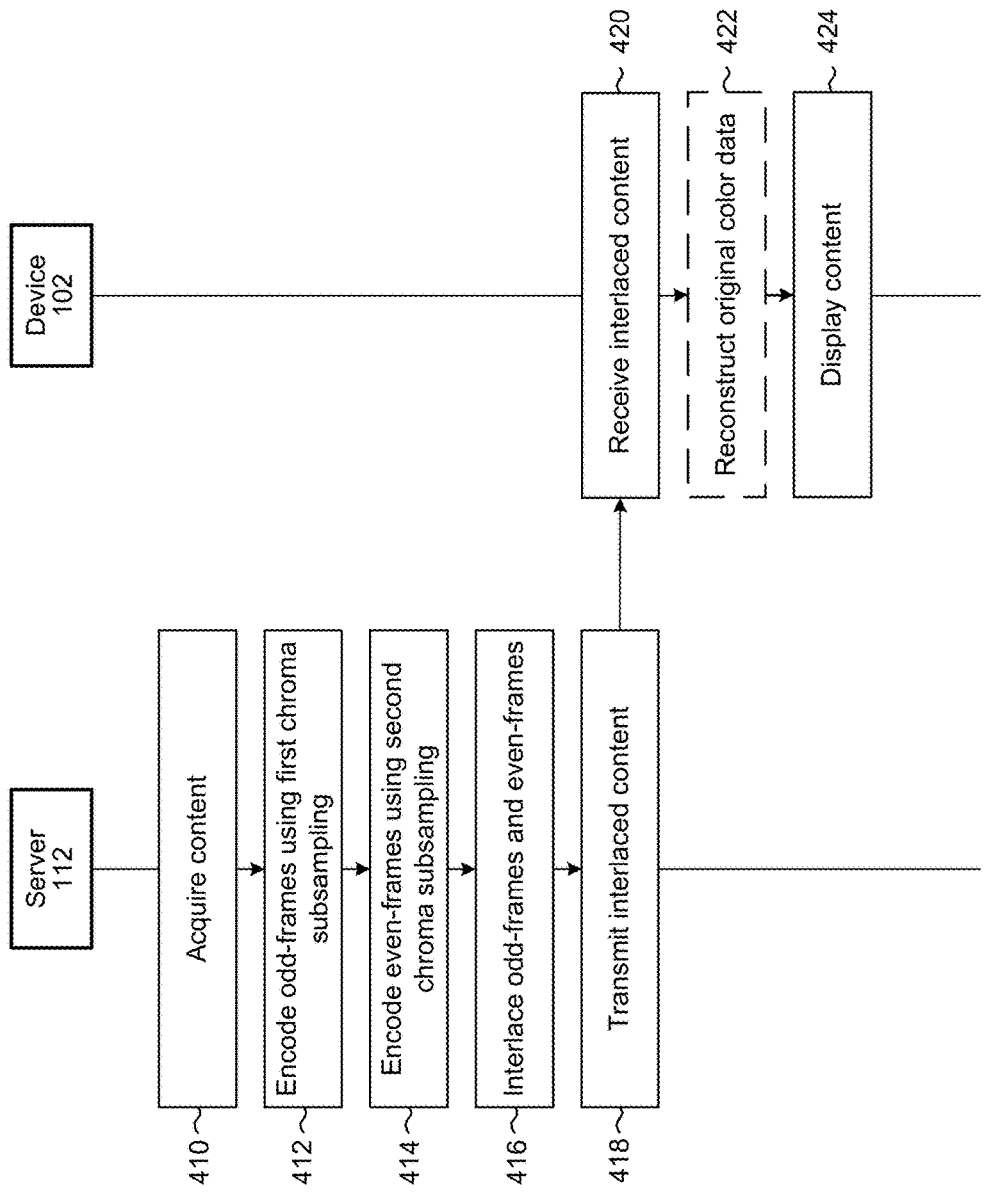
FIGS. 4A-4C are flowcharts conceptually illustrating example methods for interlacing color data according to embodiments of the present disclosure.

FIG. 4A is a flowchart conceptually illustrating an example method for interlacing color data according to embodiments of the present disclosure. As illustrated in FIG. 4A, a server 112 may acquire (410) content including an image stream signal (e.g., video content including image data for each frame of the video content), may encode (412) odd-frames using first chroma subsampling, may encode (414) even-frames using second chroma subsampling, may interlace (416) the odd-frames and even-frames and transmit (418) the interlaced content to the device 102. The device 102 may receive (420) the interlaced content, may optionally reconstruct (422) original color data and may display (424) the content.

The server 112 may optionally determine if motion is detected between sequential odd-frames and even-frames and encode the odd-frame and the even-frame using the first chroma subsampling if motion is detected. For example, the server 112 may split the content into matching frames and may determine if motion is detected between each of the matching frames. If motion is detected between the matching frames, the server 112 may ignore the interlacing method and may encode the chrominance values for the matching frames using an identical subsampling scheme, in order to eliminate motion artifacts that may be generated due to color interlacing. If motion is not detected between the matching frames, the server 112 may encode the matching frames using the first subsampling method and the second subsampling method to improve a resulting color resolution. Motion may be detected using any number of techniques known in the art.

Figure 4B:
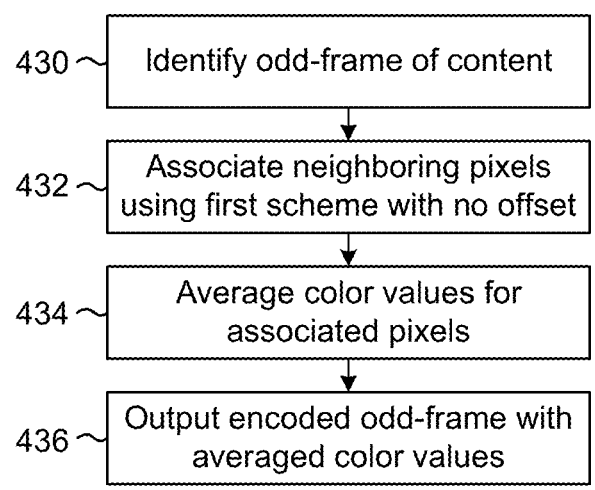

FIG. 4B describes step 412 in greater detail, as the server 112 may identify (430) an odd-frame of content, may associate (432) neighboring pixels using a first sampling scheme with no offset, may average (434) color values for the associated pixels and may output (436) the encoded odd-frame with the averaged color values. Similarly, FIG. 4C describes step 414 in greater detail, as the server 112 may identify (440) an even-frame of content, may associate (442) neighboring pixels using the first scheme with an offset, may average (444) color values for the associated pixels and may output (446) the encoded even-frame with the averaged color values. For ease of explanation, the disclosure refers to "averaging" color values in reference to an operation of calculating a new color value for a pixel using color values of associated pixels. An example of averaging may include determining an arithmetic mean, such as adding a sum of values and dividing by the number of values. However, the disclosure is not limited thereto and the server 112 may determine a weighted average, such as calculating the new color value for the pixel using weighted values of the color values of associated pixels (e.g., adjacent pixels), or any other operation known to one of skill in the art without departing from the present disclosure.

Figure 4C:
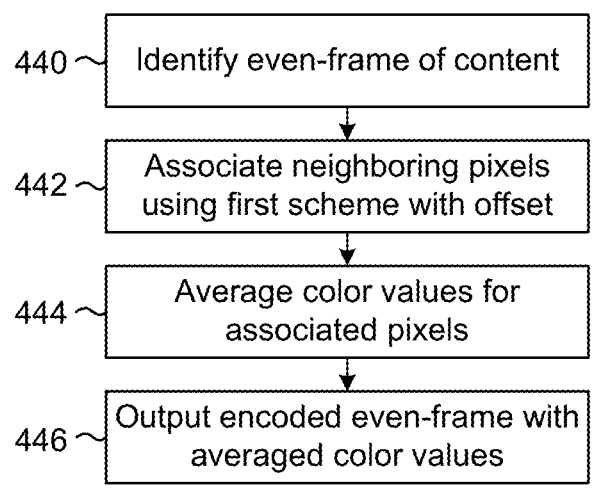

While FIGS. 4A-4C illustrate the server 112 transmitting interlaced content including two encoding options (e.g., odd-frames are encoded using a first encoding option, even-frames are encoded using a second encoding option), the present disclosure is not limited thereto. Indeed, the server 112 may transmit interlaced content including any number of encoding options without departing from the present disclosure. For example, the server 112 may use four encoding options. Thus, first frames may be encoded using a first YUV422 subsampling scheme without an offset, the first YUV422 subsampling scheme averaging adjacent pixels in a first direction (e.g., horizontally), similar to the odd-frame signal 302. Second frames may be encoded using the first YUV422 subsampling scheme with an offset in the horizontal direction, similar to the even-frame signal 304. Third frames may be encoded using a second YUV422 subsampling scheme without an offset, the second YUV422 subsampling scheme averaging adjacent pixels in a second direction (e.g., vertically). Fourth frames may be encoded using the second YUV422 subsampling scheme with an offset in the vertical direction. Therefore, the interlaced content may sequentially include a first frame using the first encoding, a second frame using the second encoding, a third frame using the third encoding and a fourth frame using the fourth encoding. In addition, the server 112 may include any combination of encoding options without departing from the present disclosure.

Interlacing two encoding options (e.g., YUV422 with no offset and YUV422 with a horizontal offset) may improve a color resolution compared to non-interlaced techniques. For example, color values for each pixel using non-interlaced techniques include the original color value equally weighted with a neighboring color value in one direction. In contrast, color values for each pixel in an interpolated image perceived by a user using interlaced techniques include a dominant signal (e.g., ½ of the color value) based on an original color value for the pixel and symmetric secondary signals (e.g., ¼ of the color value) on either side of the pixel. Therefore, interlacing four encoding options (e.g., YUV422 in a horizontal direction with no offset, YUV422 in the horizontal direction with an offset, YUV422 in a vertical direction with no offset and YUV422 in the vertical direction with an offset) may further improve the color resolution compared to interlacing using two encoding options. For example, color values for each pixel in an interpolated image perceived by a user include a dominant signal (e.g., ½ of the color value) based on an original color value for the pixel and symmetric secondary signals (e.g., ⅛ of the color value) for surrounding pixels (e.g., adjacent pixels above, below, left and right of the pixel). Therefore, color values for adjacent pixels are weighted symmetrically and the original color value for each pixel is more prominent.

Figure 5A:
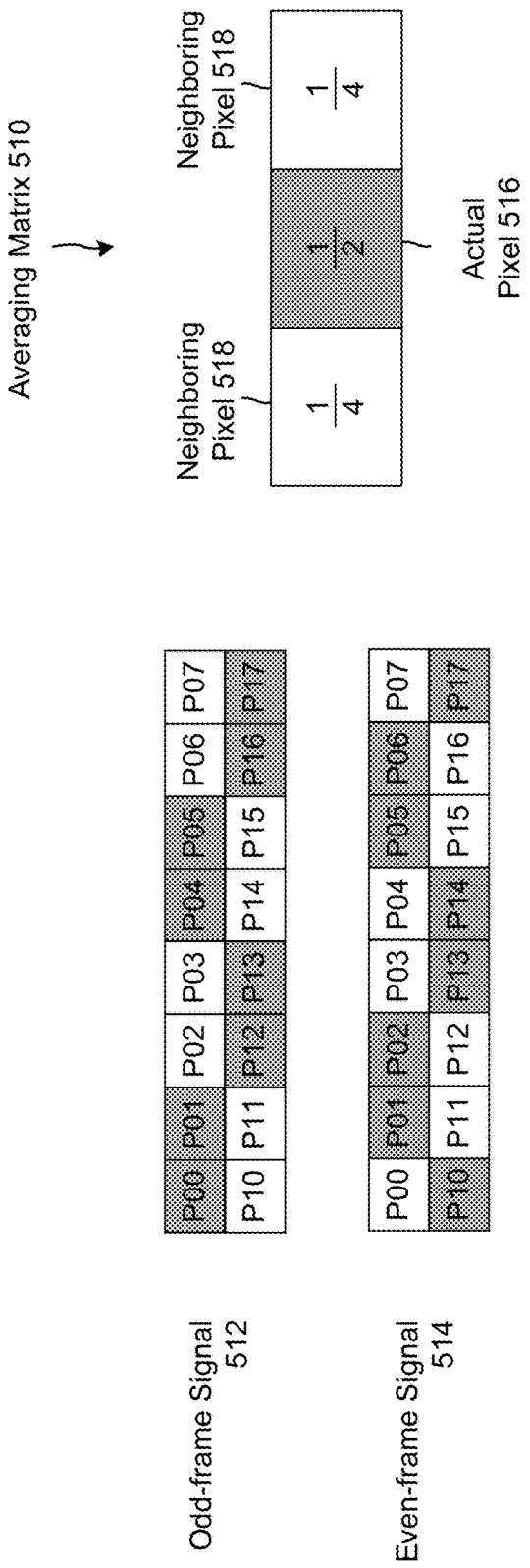

FIG. 5A illustrates an example of performing the steps of FIGS. 4A-4C using the YUV422 sampling scheme. As the YUV422 sampling scheme includes full vertical resolution for chrominance data, the offset in step 442 is one pixel in the horizontal direction. As illustrated in FIG. 5A, the odd-frame signal 512 samples pixels P00 and P01 in a first sample, P02 and P03 in a second sample and so on, while the even-frame signal 514 samples pixel P00 in a first sample, P01 and P02 in a second sample, P03 and P04 in a third sample and so on. Thus, the samples of the even-frame signal 514 are offset from the samples of the odd-frame signal 512 by one pixel horizontally, and a combination of the odd-frame signal 512 and the even-frame signal 514 includes chrominance values derived from neighboring pixels 518 along with chrominance values derived from actual pixel 516, as shown in averaging matrix 510. For YUV422 interlacing, the averaging matrix 510 weights a chrominance value for each of the neighboring pixels 518 by one quarter and for the actual pixel 516 by one half. For example, the averaged chrominance value for pixel P03 will be equal to:

$$\frac{U02}{4} + \frac{U03}{2} + \frac{U04}{4} \qquad (1)$$

Which can be rewritten as:

$$\frac{U03}{2} + \frac{(U02+U04)}{4} \qquad (2)$$

Thus, the dominant signal is the original chrominance value for P03 (e.g., U03) and the averaging matrix 510 is centered on pixel P03, with the neighboring pixels P02 and P04 weighted equally.

FIGS. 5B-5C illustrate examples of performing the steps of FIGS. 4A-4C using the YUV420 sampling scheme. As the YUV420 sampling scheme includes half horizontal resolution and half vertical resolution for chrominance data, the offset in step 442 may be one pixel in the vertical direction, as illustrated in FIG. 5B, one pixel in the horizontal direction, as illustrated in FIG. 5C, or one pixel in both the vertical and horizontal directions (not shown).

As illustrated in FIG. 5B, the odd-frame signal 522 samples pixels P00, P01, P10 and P11 in a first sample, P20, P21, P30 and P31 in a second sample and so on, while the even-frame signal 524 samples pixels P00 and P01 in a first sample, pixels P10, P11, P20 and P21 in a second sample, pixels P30 and P31 in a third sample and so on. Thus, the samples of the even-frame signal 524 are offset from the samples of the odd-frame signal 522 by one pixel vertically, and a combination of the odd-frame signal 522 and the even-frame signal 524 includes chrominance values derived from neighboring pixels 528 along with chrominance values derived from emphasized pixels 526, as shown in averaging matrix 520. For YUV420 interlacing, the averaging matrix 520 weights a chrominance value for each of the neighboring pixels 528 by one eighth and for each of the emphasized pixels 526 by one quarter. For example, the averaged chrominance value for pixel P12 will be equal to:

$$\frac{U02}{8} + \frac{U03}{8} + \frac{U12}{8} + \frac{U13}{8} + \frac{U22}{8} + \frac{U23}{8} \qquad (3)$$

Which can be rewritten as:

$$\frac{U12+U13}{4} + \frac{(U02+U03+U22+U23)}{8} \qquad (4)$$

Thus, the dominant signal is the original chrominance value for P12 and P13 (e.g., U12 and U13) and the averaging matrix 520 is centered on pixels P12 and P13, with the neighboring pixels P02, P03, P22 and P23 weighted equally.

As illustrated in FIG. 5C, the odd-frame signal 532 samples pixels P00, P01, P10 and P11 in a first sample, P20, P21, P30 and P31 in a second sample and so on, while the even-frame signal 534 samples pixels P00 and P10 in a first sample, pixels P01, P02, P11 and P12 in a second sample, pixels P03, P04, P13 and P14 in a third sample and so on. Thus, the samples of the even-frame signal 534 are offset from the samples of the odd-frame signal 532 by one pixel vertically, and a combination of the odd-frame signal 532 and the even-frame signal 534 includes chrominance values derived from neighboring pixels 538 along with chrominance values derived from emphasized pixels 536, as shown in averaging matrix 530. For YUV420 interlacing, the averaging matrix 520 weights a chrominance value for each of the neighboring pixels 538 by one eighth and for each of the emphasized pixels 536 by one quarter. For example, the averaged chrominance value for pixel P12 will be equal to:

$$\frac{U01}{8} + \frac{U11}{8} + \frac{U02}{4} + \frac{U12}{4} + \frac{U03}{8} + \frac{U13}{8} \qquad (5)$$

Which can be rewritten as:

$$\frac{U02+U12}{4} + \frac{(U01+U11+U03+U13)}{8} \qquad (6)$$

Thus, the dominant signal is the original chrominance value for P02 and P12 (e.g., U02 and U12) and the averaging matrix 530 is centered on pixels P02 and P12, with the neighboring pixels P01, P11, P03 and P13 weighted equally.

When the server 112 interlaces YUV422 signals as illustrated in FIG. 3, the device 102 may reconstruct the original YUV444 color data. To reconstruct the original YUV444 color data the odd-frame signal and the even-frame signal must be derived from similar or identical chrominance values, such as when the server 112 interlaces static scenes, where the chrominance values for a majority of pixels are identical between the odd-frame signal and the even-frame signal, or the server 112 interlaces the YUV422 signals at double the original frame rate, such as by upconverting a 60 Hz YUV444 signal to a 120 Hz YUV422 signal with each pair of frames being derived from a single frame (e.g., identical chrominance values). For example, as the even-frame signal 304 illustrated in FIG. 3 begins by sampling a single pixel (e.g., U0), the device 102 may compare the even-frame signal 304 with a corresponding odd-frame signal 302 and reconstruct an original chrominance value for each pixel.

While FIGS. 5B-5C illustrate the server 112 transmitting interlaced content including two encoding options (e.g., odd-frames are encoded using a first encoding option, even-frames are encoded using a second encoding option), the present disclosure is not limited thereto. Indeed, the server 112 may transmit interlaced content including any number of encoding options without departing from the present disclosure. For example, the server 112 may use four encoding options. Thus, first frames may be encoded using a YUV420 subsampling scheme without an offset, similar to the odd-frame signal 522. Second frames may be encoded using the YUV420 subsampling scheme with an offset in the horizontal direction, similar to the even-frame signal 524. Third frames may be encoded using the YUV420 subsampling scheme with an offset in the vertical direction, similar to the even-frame signal 534. Fourth frames may be encoded using the YUV420 subsampling scheme with an offset in both the horizontal direction and the vertical direction. Therefore, the interlaced content may sequentially include a first frame using the first encoding, a second frame using the second encoding, a third frame using the third encoding and a fourth frame using the fourth encoding, resulting in each pixel being included in four separate subsampling blocks. In addition, the server 112 may include any combination of encoding options without departing from the present disclosure. For example, the server 112 may interlace one or more frames encoded using a YUV422 subsampling scheme with one or more frames encoded using a YUV420 subsampling scheme, or any combination thereof.

Interlacing two encoding options (e.g., YUV420 with no offset and YUV420 with a horizontal offset) may improve a color resolution compared to non-interlaced techniques. For example, color values for each pixel using non-interlaced techniques include the original color value equally weighted with neighboring color values asymmetrically. In contrast, color values for each pixel in an interpolated image perceived by a user using interlaced techniques include a dominant signal (e.g., ¼ of the color value) based on an original color value for the pixel (and an adjacent pixel in a first direction) and symmetric secondary signals (e.g., ⅛ of the color value) in a second direction based on the offset (e.g., a horizontal offset results in the secondary signals being symmetrical in a horizontal direction, but not a vertical direction). Therefore, interlacing four encoding options (e.g., YUV420 with no offset, YUV420 with a horizontal offset, YUV420 with a vertical offset and YUV420 with a horizontal and vertical offset) may further improve the color resolution compared to interlacing using two encoding options. For example, color values for each pixel in an interpolated image perceived by a user include a dominant signal (e.g., ¼ of the color value) based on an original color value for the pixel and symmetric first secondary signals (e.g., ⅛ of the color value) for adjacent surrounding pixels (e.g., adjacent pixels above, below, left and right of the pixel) and secondary signals (e.g., 1/16 of the color value) for non-adjacent surrounding pixels (e.g., surrounding pixels diagonal to the pixel). Therefore, color values for surrounding pixels are weighted symmetrically and the original color value for each pixel is more prominent.

Figure 6:
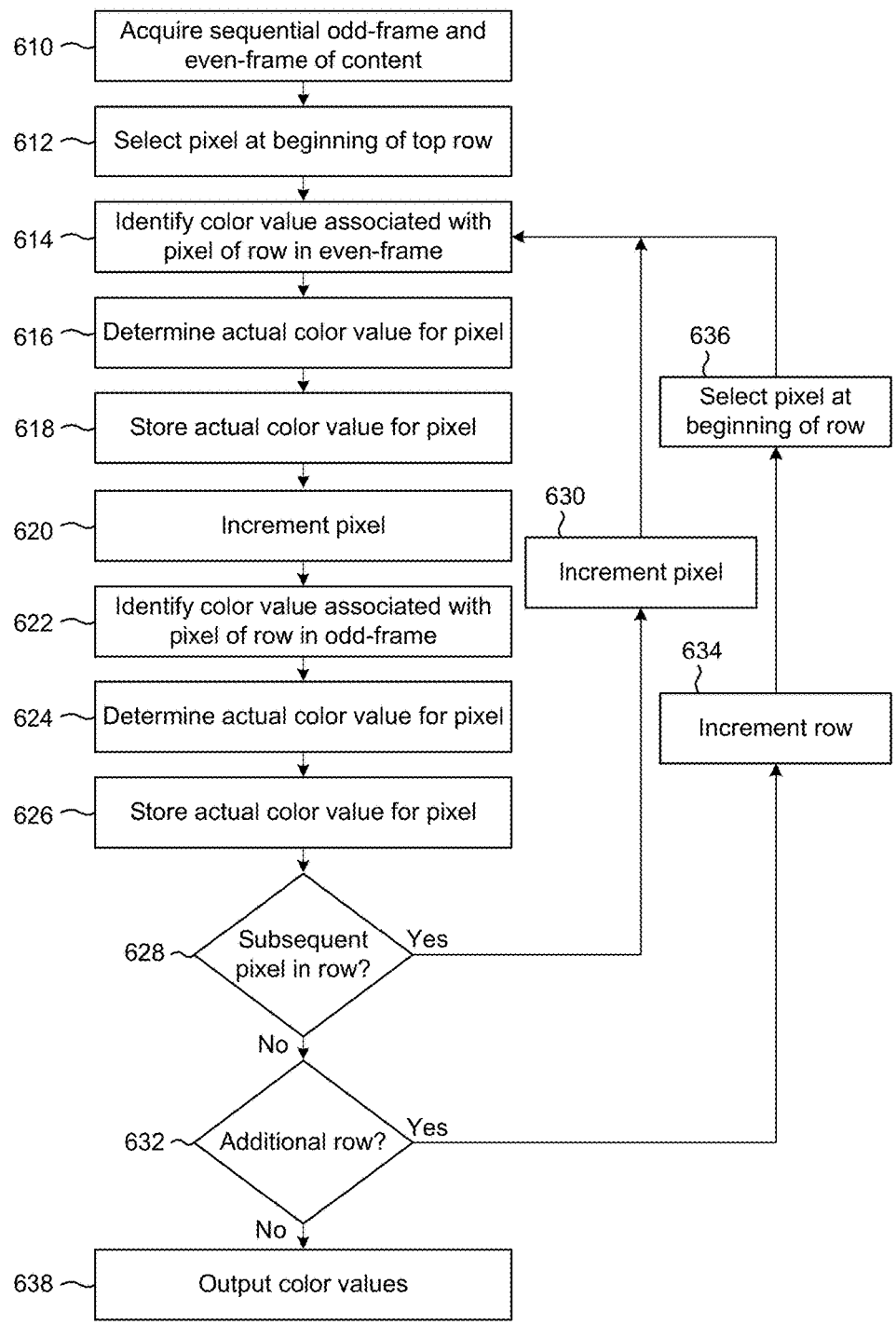
FIG. 6 is a flowchart conceptually illustrating an example method for recovering original color data from interlaced color data according to embodiments of the present disclosure.

FIG. 6 is a flowchart conceptually illustrating an example method for recovering original color data from interlaced color data according to embodiments of the present disclosure. The device 102 may acquire (610) sequential odd-frames and even-frames of content and may select (612) a pixel at a beginning of a top row. The device 102 may identify (614) a color value associated with the pixel of the row in the even-frame, may determine (616) the actual color value for the pixel and may store (618) the color value for the pixel. The device 102 may increment (620) the pixel, may identify (622) a color value associated with the pixel of the row in the odd-frame, may determine (624) an actual color value for the pixel and may store (626) the actual color value for the pixel.

The device 102 may then determine (628) if there is a subsequent pixel in the row. If there is a subsequent pixel in the row, the device 102 may increment (630) the pixel and repeat steps 614-628 until there isn't a subsequent pixel in the row. If there isn't a subsequent pixel in the row, the device 102 may determine (632) if there is an additional row of pixels. If there is an additional row of pixels, the device 102 may increment (634) the row and may select (636) a pixel at the beginning of the row and repeat steps 614-630 until there isn't an additional row of pixels. Once there isn't an additional row of pixels, indicating the end of the image frame, the device 102 may output (638) the color values.

Figure 7:
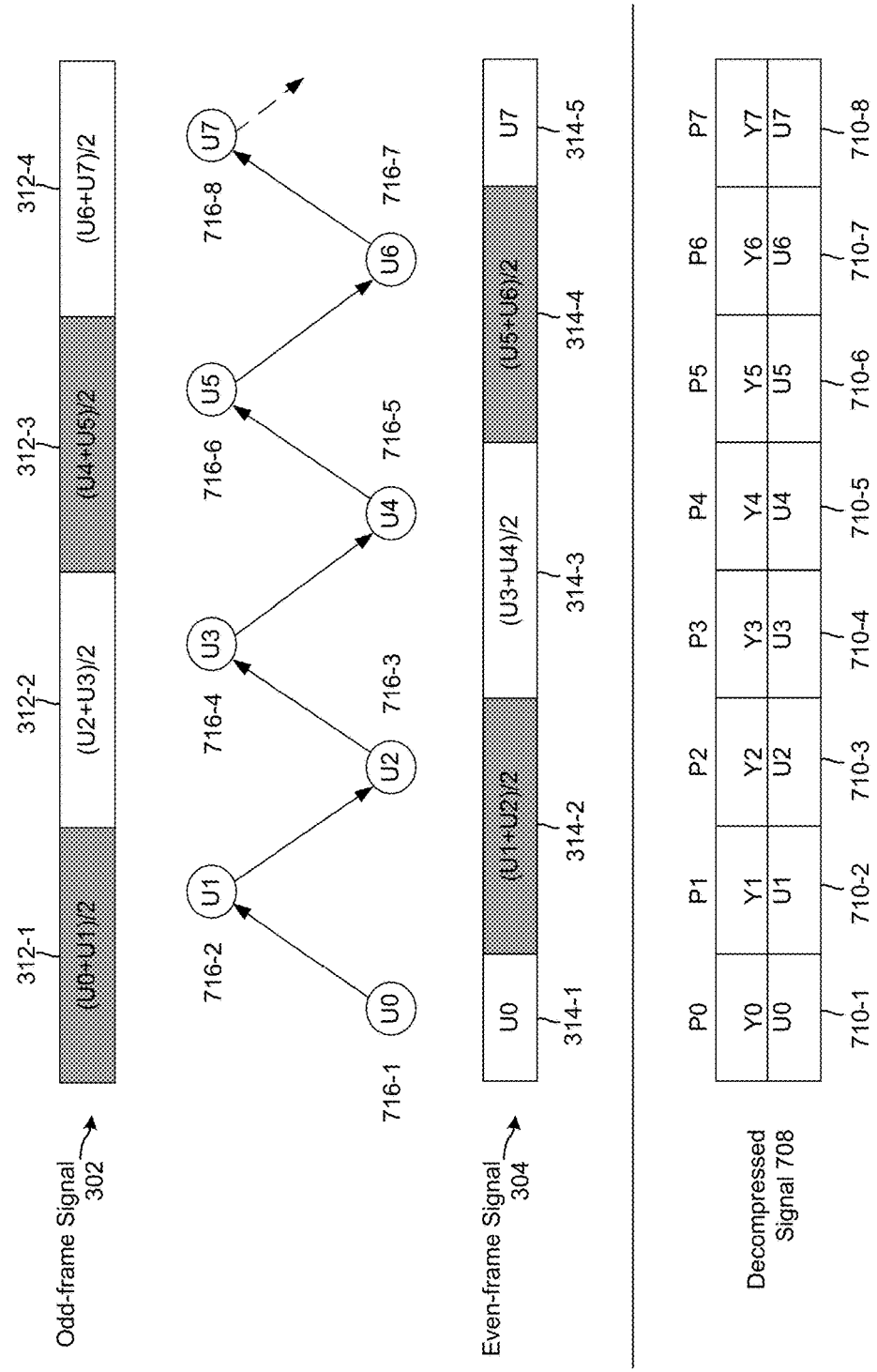
FIG. 7 illustrates an example of recovering original color data from interlaced color data according to embodiments of the present disclosure.

FIG. 7 illustrates an example of recovering original color data from interlaced color data according to embodiments of the present disclosure. For example, the device 102 may identify a color value associated with a first pixel P0 in the even-frame, which is the first sample 314-1 having a value of U0. The device 102 may determine that an actual color value 710-1 for the first pixel P0 is equal to U0 using a first calculation 716-1 and may store the actual color value 710-1 for the first pixel P0. The device 102 may then increment the pixel to second pixel P1 and may identify the color value associated with the second pixel P1 in the odd-frame, which is the first sample 312-1 having a value of (U0+U1)/2. The device 102 may determine the actual color value 710-2 for the second pixel P1 (e.g., U1) using the first sample 312-1 and the actual color value 710-1 of the first pixel P0 in a second calculation 716-2. For example, the device 102 may multiply the first sample 312-1 by two and subtract the actual color value 710-1 for the first pixel P0 (e.g., U0) to determine the actual color value 710-2 for the second pixel P1 (e.g., U1).

As there is a subsequent pixel in the row, the device 102 may increment the pixel to the third pixel P2 and may identify the color value associated with the third pixel P2 in the even-frame, which is the second sample 314-2 having a value of (U1+U2)/2. The device 102 may determine an actual color value 710-3 for the third pixel P2 (e.g., U2) using the second sample 314-2 and the actual color value 710-2 of the second pixel P1 (e.g., U1) in a third calculation 716-3. Similarly, the device 102 may increment the pixel to the fourth pixel P3 and identify the color value associated with the fourth pixel P3 in the odd-frame, which is the second sample 312-2, and determine the actual color value 710-4 for the fourth pixel P3 (e.g., U3) in a fourth calculation 716-4. Thus, the device 102 may alternate calculations 716 between the odd-frame signal 302 and the even-frame signal 304 until determining the actual color value 710 for each pixel.

While FIGS. 6 and 7 illustrate identify color values associated with individual pixels by incrementing rows of pixels, the disclosure is not limited thereto. Instead, the server 112 may identify color values associated with individual pixels by incrementing squares or tiles of pixels instead of rows of pixels. Similarly, the server 112 may identify color values associated with squares or tiles of pixels by incrementing rows of squares or tiles without departing from the present disclosure.

While FIGS. 6 and 7 illustrate the device 102 reconstructing the original YUV444 color data, the disclosure is not limited thereto. Reconstructing the original YUV444 color data may require that the server 112 generate pairs of frames (one odd-frame and one even-frame) from a single frame or similar chrominance values. However, the server 112 may generate odd-frames and even-frames independently without departing from the disclosure. For example, the server 112 may generate the YUV422 signal at the same frequency as the YUV444 signal (e.g., 60 Hz) and the device 102 may reconstruct the original YUV444 color data only for pairs of frames including a static scene. For dynamic scenes, odd-frames and even-frames may have different color data and the reconstructed color data is not equal to the original YUV444 color data. In addition, reconstructing the original YUV444 color data may require that the device 102 is configured to reconstruct the original YUV444 color data from matched frames of YUV422 color data. However, the disclosure is not limited thereto and the device 102 may display the odd-frames and even-frames received from the server 112 without additional processing. Thus, the disclosure is backwards compatible with existing devices 102 and the existing devices 102 may improve a color resolution by displaying the interlacing signals.

While the previous figures and corresponding description disclose improving color resolution by interlacing chrominance signals, the server 112 may improve color resolution by interlacing luminance signals. While content may be stored and transmitted as YUV signals, the content is captured/created as RGB signals and displayed as RGB signals. Thus, the captured/created RGB signals are converted to YUV signals, the YUV signals are transmitted and/or stored and then converted to RGB signals prior to being displayed. Converting the YUV signals to RGB signals calculates each red, green and blue pixel using the luminance and chrominance values (e.g., Y, U and V values). Thus, the luminance values affect the RGB signals and may be modified to improve a color resolution of the RGB signals.

Figure 8A:
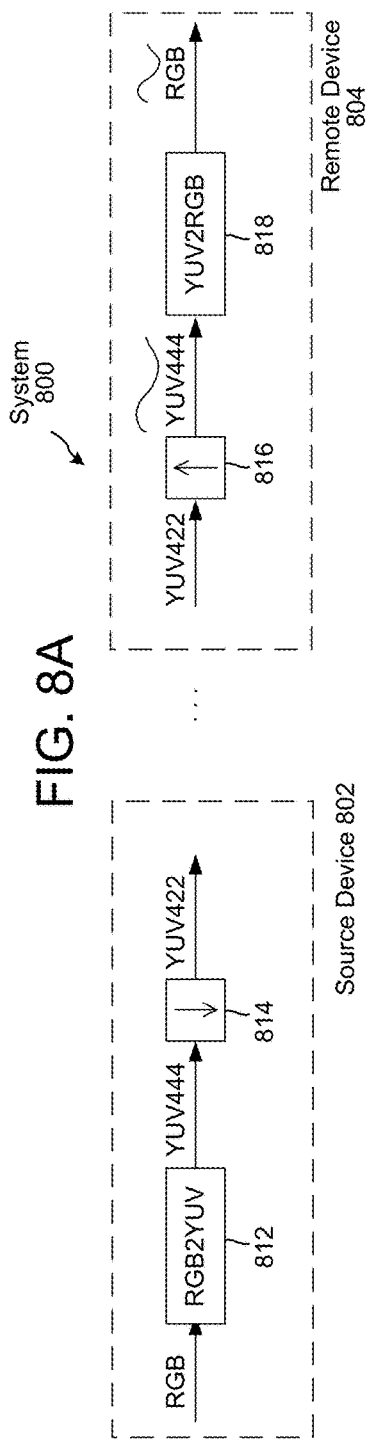
FIGS. 8A-8B illustrate example system diagrams for converting RGB and YUV signals and for using luminance data for temporal color interlacing according to embodiments of the present disclosure.

FIG. 8A illustrates an example system diagram for converting RGB and YUV signals. Typically, a system 800 receives an input RGB signal and converts it to a YUV444 signal using RGB2YUV converter 812. The YUV444 signal is then encoded to a YUV422 signal using encoder 814. The RGB2YUV converter 812 and the encoder 814 are typically included in source device 802 used to process and transmit a signal to a remote device 804, such as broadcasting the signal (e.g., over the air, through a cable network, through satellite, or the like) or streaming the signal on a network. Other processing may be performed on the YUV422 signal, but eventually the YUV422 signal is transmitted from the source device 802 to the remote device 804 to be displayed. The remote device 804 may receive the YUV422 signal, decode the YUV422 signal to a YUV444 signal using decoder 816 and convert the YUV444 signal to an output RGB signal using a YUV2RGB converter 818.

Figure 8B:
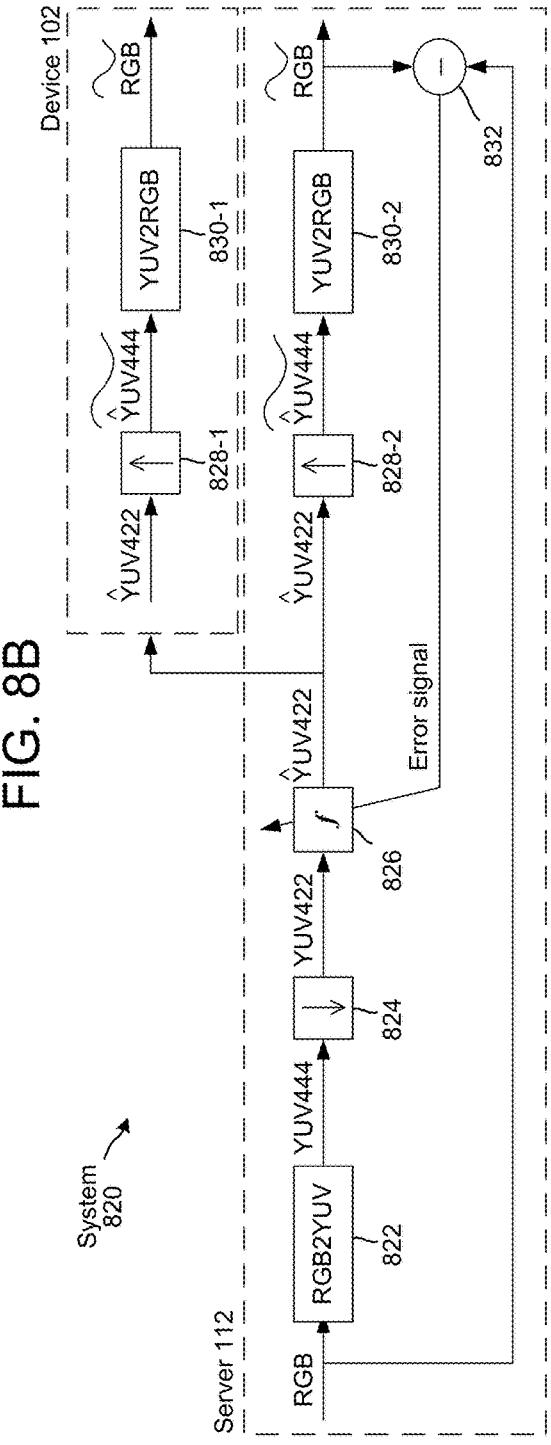

FIG. 8B illustrates an example system diagram for using luminance data for temporal color interlacing according to embodiments of the present disclosure. Similar to the system 800, system 820 may receive an input RGB signal and convert it to a YUV444 signal using RGB2YUV converter 822. The YUV444 signal may be encoded to a YUV422 signal using encoder 824. However, the YUV422 signal may be modified by a function to generate a ŶUV422 signal using function block 826. The RGB2YUV converter 822, the encoder 824 and the function block 826 may be included in the server 112 to process the RGB signal before transmitting the ŶUV422 signal to one or more remote devices, such as device 102. Eventually the ŶUV422 signal is transmitted from the server 112 to the device 102 to be displayed. The device 102 may receive the ŶUV422 signal, decode the ŶUV422 signal to a ŶUV444 signal using a first decoder 828-1 and convert the ŶUV444 signal to an output RGB signal using a first YUV2RGB converter 830-1. As the output RGB signal in the system 820 is converted from the ŶUV444 signal, instead of the YUV444 signal, the output RGB signal may have an improved color resolution due to the function block 826 modifying the luminance.

To improve the color resolution of the output RGB signal, the server 112 may approximate the output RGB signal and adjust the function block 826 accordingly. Thus, the server 112 may decode the ŶUV422 signal to the ŶUV444 signal using a second decoder 828-2 and convert the ŶUV444 signal to the output RGB signal using a second YUV2RGB converter 830-2, where the second decoder 828-2 and the second YUV2RGB converter 830-2 are included in the server 112. The server 112 may compare the output RGB signal to the input RGB signal to generate an error signal using a difference block 832 and may modify the function block 826 based on the error signal. The error signal represents an error between the original RGB signal (e.g., input RGB signal) and the reconstructed RGB signal (e.g., output RGB signal) after conversion. The server 112 may tune the function block 826 based on the error signal either automatically, such as by closing the loop and driving the error signal toward zero, or using a training procedure to reduce the error signal based on user input. For example, a user may define a function used in the function block 826 to minimize the perceived difference according to user preference. Thus, the server 112 may approximate the output RGB signal, compare the output RGB signal to the input RGB signal and modify the function block 826 to minimize an error between the output RGB signal and the input RGB signal prior to transmitting the ŶUV422 signal to the device 102.

To improve the color resolution of the output RGB signal, the function block 826 may modify luminance data of the YUV422 signal using a first technique for odd-frames and a second technique for even-frames. While the odd-frames and the even-frames may include modified luminance data, an interpolated signal combining the odd-frames and the even-frames may include the same luminance data as the unprocessed YUV422 signal.

FIG. 9 illustrates an example of color data signals when using luminance data for temporal color interlacing according to embodiments of the present disclosure. As illustrated in FIG. 9, an uncompressed signal 900 may include Y signals 902, U signals 904 and V signals 906 for each pixel (e.g., pixels P0-P3). The server 112 may generate odd-frame signal 910 and even-frame signal 920 from the uncompressed signal 900. The odd-frame signal 910 and the even-frame signal 920 may use the YUV422 sampling scheme, described in greater detail above, so that the U signals 914/924 and the V signals 916/926 sample two pixels at a time. An interpolated signal 930 derived from the odd-frame signal 910 and the even-frame signal 920 may include U signals 934 and V signals 936 based on the U signals 914/924 and the V signals 916/926. While FIG. 9 illustrates the odd-frame signals 910 and the even-frame signals 920 using an identical chroma subsampling scheme, the disclosure is not limited thereto and the odd-frame signals 910 may use a first subsampling scheme while the even-frame signals 920 use a second subsampling scheme, as described in greater detail above with regard to FIGS. 3-7.

To improve the color resolution of the output RGB signal, the server 112 may modify luminance data of the uncompressed signal 900 using a first technique for the odd-frame signal 910 and a second technique for the even-frame signal 920. For example, first Y signals 912 in the odd-frame signal 910 may use a first series of functions (e.g., $f_0^{odd}$, $f_1^{odd}$, $f_2^{odd}$, $f_3^{odd}$) to modify the luminance data for the odd-frame signal 910 (e.g., $Y_0^{odd}$, $Y_1^{odd}$, $Y_2^{odd}$, $Y^3_{odd}$), while second Y signals 922 in the even-frame signal 920 may use a second series of functions (e.g., $f_0^{evn}$, $f_1^{evn}$, $f_2^{evn}$, $f_3^{evn}$) to modify the luminance data for the even-frame signal 920 (e.g., $Y_0^{evn}$, $Y_1^{evn}$, $Y_2^{evn}$, $Y_3^{evn}$). However, the first series of functions and the second series of functions are determined such that a sum of the first function and the second function for each pixel is equal to a sum of the odd-frame luminance value and even-frame luminance value for the pixel. This is shown in the following equation:

$$f_n^{odd}(Y_n^{odd}) + f_n^{evn}(Y_n^{evn}) = Y_n^{odd} + Y_n^{evn} \quad (7)$$

Thus, the server 112 may modify a first luminance value 912-1 for a first pixel P0 in the odd-frame signal 910 to improve color data for the first pixel P0 in an odd-frame after an RGB conversion and may modify a second luminance value 922-1 for the first pixel P0 in the even-frame signal 920 to improve color data for the first pixel P0 in an even-frame after an RGB conversion, but a luminance value (e.g., $(f_0^{odd}(Y_0^{odd}) + f_0^{evn}(Y_0^{evn}))/2$) for the first pixel P0 in an interpolated signal derived from the odd-frame signal 910 and the even-frame signal 920 may be equal to a luminance value (e.g., $(Y_0^{odd} + Y_0^{evn})/2$) for the first pixel P0 in an interpolated signal derived from an odd-frame and an even-frame of the uncompressed signal 900. This relationship is illustrated in Y signals 932 of the interpolated signal 930.

Figure 10:
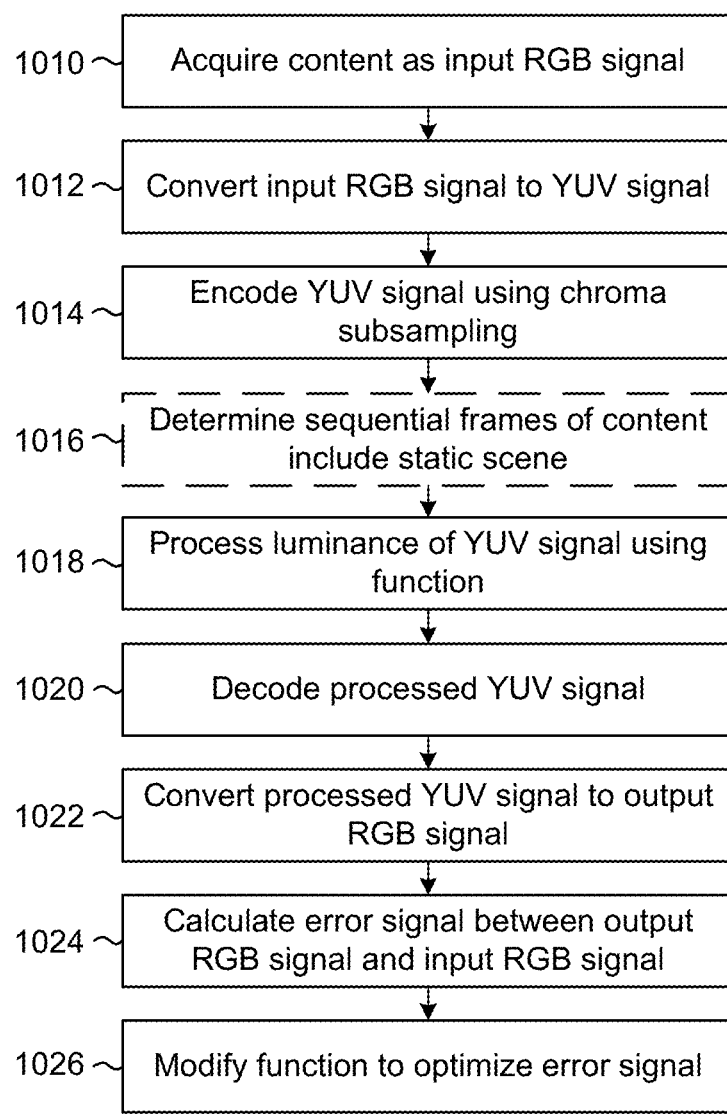
FIG. 10 is a flowchart conceptually illustrating an example method for using luminance data for temporal color interlacing according to embodiments of the present disclosure.

FIG. 10 is a flowchart conceptually illustrating an example method for using luminance data for temporal color interlacing according to embodiments of the present disclosure. The server 112 may acquire (1010) content as an input RGB signal, may convert (1012) the input RGB signal to a YUV signal and may encode (1014) the YUV signal using chroma subsampling. The server 112 may optionally determine (1016) if sequential frames of the content include a static scene and then may process (1018) luminance of the YUV signal using a function. For example, the server 112 may split the YUV signal into matching frames and may determine if motion is detected between each of the matching frames. If motion is detected between the matching frames, the server 112 may ignore the interlacing method and may output the luminance values for the matching frames without processing the luminance values using the function, in order to eliminate motion artifacts that may be generated due to luminance interlacing. If motion is not detected between the matching frames, the server 112 may process the luminance values of the matching frames using the function, as described in greater detail above with regard to FIGS. 8B and 9.

The server 112 may decode (1020) the processed YUV signal, convert (1022) the processed YUV signal to an output RGB signal, calculate (1024) an error signal between the output RGB signal and the input RGB signal and modify (1026) the function to optimize the error signal. Thus, the function may be determined using a feedback loop to generate an optimized output RGB signal.

Converting between RGB and YUV signals may be done in a number of ways, including ways that are generally accepted in the art. For example, during step 1012, the server 112 may use the following equations to derive the YUV signal from the RGB signal:

$$Y = 0.299R + 0.587G + 0.114B$$

$$U = 0.492(B - Y)$$

$$V = 0.877(R - Y)$$

Conversely, during step 1022 the server 112 may use the following equations to derive the RGB signal from the YUV signal:

$$R = Y + 1.14V$$

$$G = Y - 0.395U - 0.581V$$

$$B = Y + 2.033U$$

In addition to approximating the output RGB signal using a generic RGB signal, the server 112 may approximate the output RGB signal in step 1022 based on a particular color gamut. For example, different displays may generate different output RGB signals from a single input YUV signal, depending on circuitry, algorithms and other variables. As a manufacturer may share similar circuitry, algorithms or other components amongst multiple displays, displays from the manufacturer may share a particular color gamut. Therefore, the server 112 may approximate the output RGB signal using the particular color gamut associated with the manufacturer. For example, the second YUV2RGB converter 830-2 may be programmed to approximate a color gamut associated with the first YUV2RGB converter 830-1, resulting in improved color resolution on the device 102.

While reconstructing chrominance values improves a color resolution of the displayed content, chroma subsampling may still produce color distortion when sampling pixels along edges within the content. For example, an area surrounding edge(s) of objects visible in the content may be referred to as a high edge area, and variations in luminance values or chrominance values may correspond with the edges in the high edge area. As an example, a pattern of lines, such as a picket fence, may include a number of edges (e.g., variations in luminance along a border of each fence post) and an area including the picket fence may be considered a high edge area. As another example, text appearing in an image, especially colored text superimposed on a colored image, may include a number of edges (e.g., variations in luminance along a border of each letter). Thus, color distortion or aliasing of improper colors may be produced due to chroma subsampling sampling pixels and averaging discontinuous chrominance values of the pixels on both sides of an edge within the high edge area. However, the human visual system is less perceptive to colors in areas with high luminance activity, responding more strongly to the edge (e.g., luminance transition) than the color data along the edge. Therefore, the color distortion may be lessened by desaturating chrominance values of pixels in the high edge area. The amount of desaturation may be controlled according to an amount of edginess that can be estimated with any acceptable method for edge detection, such as by using gradients, second derivatives or Canny operator or other techniques known in the art. Smooth areas without edges will not be desaturated, as there are no edges, and will therefore retain original chrominance values.

Figure 11A:
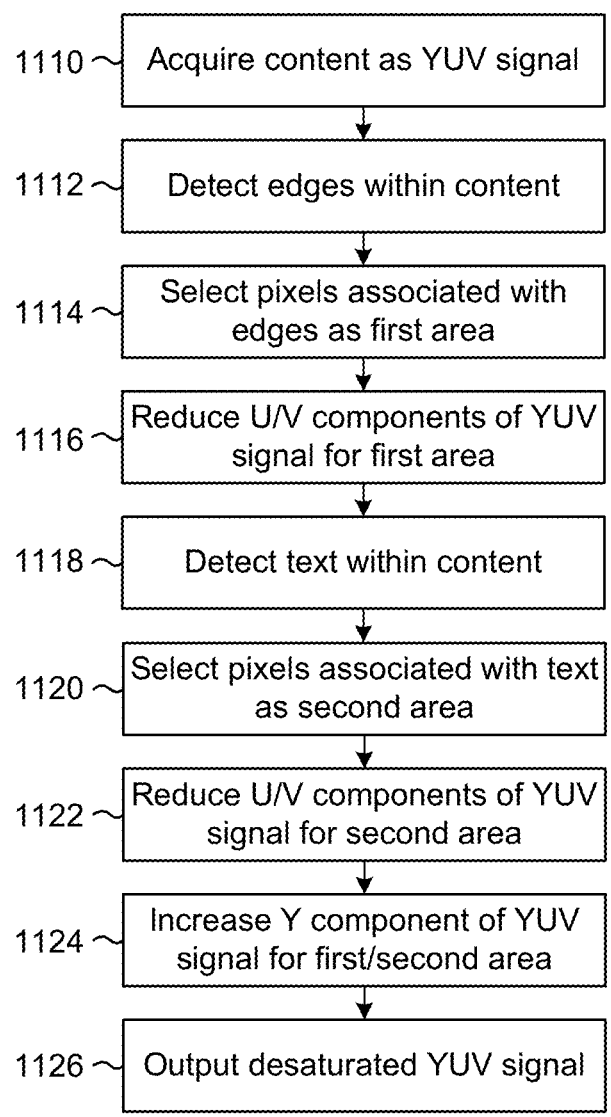
FIGS. 11A-11B are flowcharts conceptually illustrating an example method for adaptive color desaturation according to embodiments of the present disclosure.

FIG. 11A is a flowchart conceptually illustrating an example method for adaptive color desaturation according to embodiments of the present disclosure. As illustrated in FIG. 11A, the server 112 may acquire (1110) content as a YUV signal. For example, the server 112 may acquire a YUV signal or may acquire a RGB signal and convert the RGB signal to a YUV signal.

The server 112 may detect (1112) edges within the content, may select (1114) pixels associated with the edges as a first area, and may reduce (1116) U/V components of YUV signal for the first area. For example, the server 112 may detect edges based on variations in luminance values or chrominance values, or may perform edge detection using methods known to one of skill in the art, such as by using gradients, second derivatives or Canny operator, as mentioned above. The server 112 may reduce the U/V components of the YUV signal as described in greater detail below with regard to FIG. 11B.

While step 1112 may detect edges within the content generally, additional color distortion may be produced by text. Therefore, the server 112 may perform additional and/or increased desaturation for areas associated with text to further reduce color distortion. Thus, the server 112 may detect (1118) text within the content, may select (1120) pixels associated with the text as a second area and may reduce U/V components of the YUV signal for the second area, as described in greater detail below with regard to FIG. 11B. The server 112 may detect edges as discussed above, but may specifically target edges associated with text. While FIG. 11A illustrates the first area being desaturated and the second area being desaturated, the first area may include the second area and therefore the second area may be desaturated twice. However, the disclosure is not limited thereto and the first area may omit areas containing text that are associated with the second area.

To improve a uniformity of the content and further emphasize the edges, the server 112 may increase a luminance for pixels that were desaturated. For example, the increased luminance may offset the reduced chrominance so that the high edge areas (e.g., the first area and the second area) are displayed similarly to the rest of the content, while also increasing a visibility of the edges within the high edge areas. Thus, the server 112 may increase (1124) the Y component of the YUV signal for the first area and the second area. As an example, the luminance may be increased using the following equation:

$$Y_{boost}=\min(Y_{original}*A_{boost}, 255) \qquad (8)$$

where $Y_{boost}$ is the increased luminance value, $Y_{original}$ is the original luminance value and $A_{boost}$ is a constant equal to or greater than one. The minimum function prevents the increased luminance value from exceeding a maximum value of 255. Thus, the luminance value is increased for pixels on the edges within the high edge area without exceeding the value of 255. Finally, the server 112 may output (1126) the desaturated YUV signal.

Figure 11B:
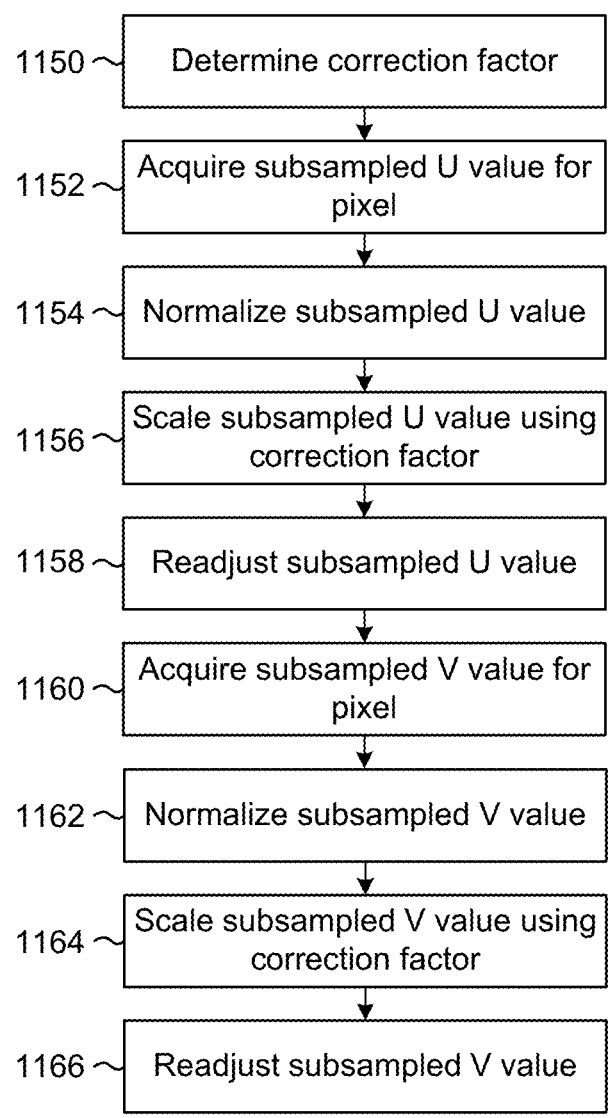

FIG. 11B illustrates steps 1116 and 1122 in greater detail. As illustrated in FIG. 11B, the server 112 may determine (1150) a correction factor. The correction factor is calculated using the following equation:

$$\text{Chroma\_correction\_factor}=B_{desaturate}^{(1/\text{number\_of\_edge\_pixels})} \qquad (9)$$

where Chroma_correction_factor is the correction factor, $B_{desaturate}$ is a constant between 0 and 1 and number_of_edge_pixels is a number of edge pixels within a particular window or portion of the high edge area surrounding a pixel being modified. $B_{desaturate}$ controls an amount of desaturation, with a larger value (e.g., value approaching 1) resulting in greater desaturation and a lesser value (e.g., value approaching 0) resulting in less desaturation. The value of $B_{desaturate}$ may be defined by the server 112, selected by a user of the server 112 or set as a constant for the server 112 based on experimental results. To reduce or prevent distortion and resulting degradation of color fidelity, the correction factor is identical for the U components and the V components.

After determining the correction factor, the server 112 may acquire (1152) a subsampled U value for the pixel being modified, may normalize (1154) the subsampled U value, may scale (1156) the subsampled U value using the correction factor, and may readjust (1158) the subsampled U value.

For example, the subsampled U value may be centered on a grey level having a chrominance value of 128. Thus, the server 112 may subtract 128 from the subsampled U value to generate a normalized U value, may multiply the normalized U value by the correction factor to generate a scaled U value and may add 128 to the scaled U value to generate the desaturated U value. Thus, the desaturated U value for a selected pixel in the high edge area may be calculated using the following equation:

$$U_{desaturated}=(U_{subsampled}-128)*\text{Chroma\_correction\_factor}+128 \qquad (10)$$

where $U_{desaturated}$ is the desaturated U value, $U_{subsampled}$ is the subsampled U value and the Chroma_correction_factor is determined as discussed above with regard to equation (9). The correction factor may vary between the first area and the second area by using a different constant for $B_{desaturate}$. For example, a first correction factor for the first area may be closer to 1 (e.g., less desaturation) relative to a second correction factor for the second area, such that the second correction factor increases the desaturation for pixels associated with text in the second area.

After desaturating the U component, the server 112 may acquire (1160) subsampled V value for the pixel being modified, may normalize (1162) the subsampled V value, may scale (1164) the subsampled V value using the correction factor and may readjust (1166) the subsampled V value. For example, similar to equation (10) discussed above, the subsampled V value may be centered on a grey level having a chrominance value of 128. Thus, the server 112 may subtract 128 from the subsampled V value to generate a normalized V value, may multiply the normalized V value by the correction factor to generate a scaled V value and may add 128 to the scaled V value to generate the desaturated V value. Thus, the desaturated V value for a selected pixel in the high edge area may be calculated using the following equation:

$$V_{desaturated}=(V_{subsampled}-128)*\text{Chroma\_correction\_factor}+128 \qquad (11)$$

where $V_{desaturated}$ is the desaturated V value, $V_{subsampled}$ is the subsampled V value and the Chroma_correction_factor is determined as discussed above with regard to equation (9).

Adaptive color desaturation may be automatically generated by the server 112 based on user preferences, system settings or other criteria. Alternatively, the adaptive color desaturation may be generated in response to a user input. For example, a user may notice a region of image degradation or lack of color fidelity and may request that the server 112 perform adaptive color desaturation. In addition, adaptive color desaturation may be performed differently based on an application or type of publication. For example, the server 112 may use first user preferences, system settings or other criteria to perform adaptive color desaturation for an electronic book, while using second user preferences, system settings or other criteria to perform adaptive color desaturation for video content. Therefore, an amount of edge detection and/or desaturation may depend on the content being encoded.

While FIGS. 11A-11B describe the server 112 adaptively desaturating the chrominance values, the present disclosure is not limited thereto and the device 102 may perform any of the steps discussed with regard to FIGS. 11A-11B without departing from the disclosure.

Figure 12:
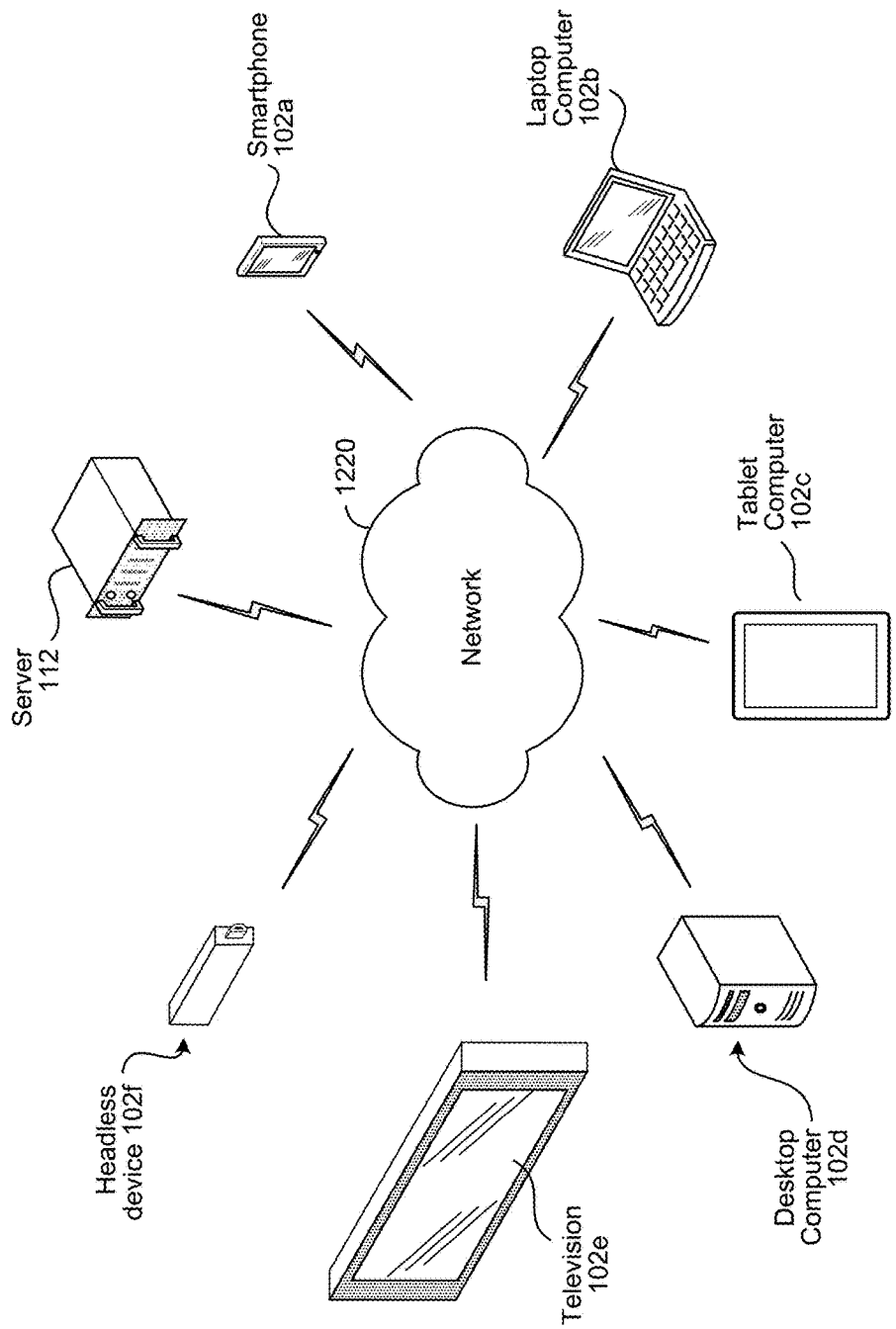
FIG. 12 is a block diagram conceptually illustrating an example of a computer network for use with the present system.

As shown in FIG. 12, multiple devices may be connected over a network 1220. The network 1220 may include a local or private network or may include a wide network such as the internet. Devices may be connected to the network 1220 through either wired or wireless connections. For example, a smart phone 102*a* may be connected to the network 1220 through a wireless service provider. Other devices, such as laptop computer 102*b*, tablet computer 102*c*, desktop computer 102*d*, television 102*e*, headless device 102*f* and/or server 112, may connect to the network 1220 through a wired connection. The server 112 may be configured to receive, store, process and/or stream data related to images and/or video displayed on one or more of the smartphone 102*a*, laptop computer 102*b*, tablet computer 102*c*, desktop computer 102*d* and television 102*e* (either directly or via the headless device 102*f*), etc. For example, the server 112 may perform any of the steps described above with regard to FIGS. 1A, 1B, 4A-4C, 10 and/or 11. Alternatively, the server 112 may receive and store data generated by the smartphone 102*a*, laptop computer 102*b*, tablet computer 102*c*, desktop computer 102*d*, etc. using any of the steps described above. Thus, the sever 112 may process and output data, images and video to allow convenient access to any of the devices connected to the server 112.

Figure 13B:
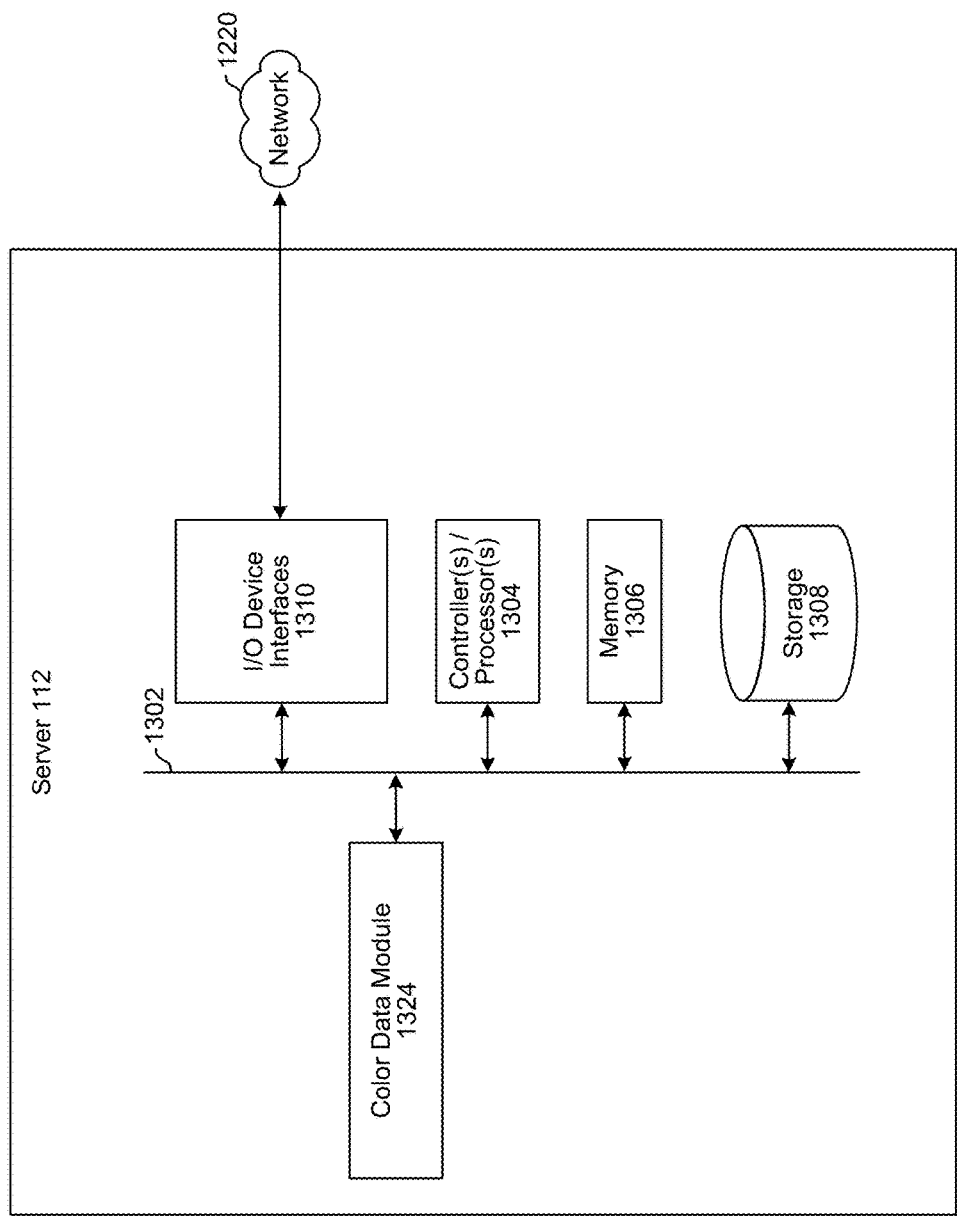

FIGS. 13A and 13B illustrate block diagrams conceptually illustrating example components of a system including one or more of a computing device 102 and a remote server 1312. Depending upon how the system is structured, some of the components illustrated in FIG. 13A as part of the device 102 or in FIG. 13B as part of the remote server 1312 may be included only in the device 102 or in the server 112, or may be distributed across multiple devices 102 and/or servers 112. Other components not illustrated may also be included in the device 102 and/or the server 112. In operation, the system may include computer-readable and computer-executable instructions that reside in storage 1308 on the device 102 and/or server 112. The device 102 may be an electronic device capable of displaying images. Examples of electronic devices may include computers (e.g., a desktop, a laptop, a server or the like), portable devices (e.g., an electronic reader, smart phone, tablet, smart watch or the like) or the like. The device 102 may also be a component of any of the abovementioned devices or systems. The server 112 may be a single server or a group of servers.

As illustrated in FIG. 13, the device 102 and/or the sever 112 may include an address/data bus 1302 for conveying data among components of the computing device 102 and/or server 112. Each component within the computing device 102 and/or server 112 may also be directly connected to other components in addition to (or instead of) being connected to other components across the bus 1302.

The computing device 102 and/or server 112 may include one or more controllers/processors 1304 comprising one-or-more central processing units (CPUs) for processing data and computer-readable instructions and a memory 1306 for storing data and instructions. The memory 1306 may include volatile random access memory (RAM), non-volatile read only memory (ROM), non-volatile magnetoresistive (MRAM) and/or other types of memory. The device 102 and/or server 112 may also include a data storage component 1308 for storing data and processor-executable instructions. The data storage component 1308 may include one or more non-volatile storage types such as magnetic storage, optical storage, solid-state storage, etc. The device 102 and/or server 112 may also be connected to a removable or external non-volatile memory and/or storage (such as a removable memory card, memory key drive, networked storage, etc.) through the input/output device interfaces 1310. The input/output device interfaces 1310 may be configured to operate with a network 1220, for example a wireless local area network (WLAN) (such as WiFi), Bluetooth, zigbee and/or wireless networks, such as a Long Term Evolution (LTE) network, WiMAX network, 3G network, etc. The network 1220 may include a local or private network or may include a wide network such as the internet. Devices may be connected to the network 1220 through either wired or wireless connections.

The device 102 and/or server 112 includes input/output device interfaces 1310. A variety of components may be connected through the input/output device interfaces 1310, such as the display or display screen 104 having a touch surface or touchscreen; an audio output device for producing sound, such as speaker(s) 1312; one or more audio capture device(s), such as a microphone or an array of microphones 1314; one or more image and/or video capture devices, such as camera(s) 1316; one or more haptic units 1318; and other components. The display 104, speaker(s) 1312, microphone(s) 1314, camera(s) 1316, haptic unit(s) 1318, and other components may be integrated into the device 102 or may be separate.

The display 104 may be a video output device for displaying images. The display 104 may be a display of any suitable technology, such as a liquid crystal display, an organic light emitting diode display, electrophoretic display, electrowetting display, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104.

The input/output device interfaces 1310 may also include an interface for an external peripheral device connection such as universal serial bus (USB), FireWire, Thunderbolt, Ethernet port or other connection protocol that may connect to networks 1220. The input/output device interfaces 1310 may also include a connection to antenna 1322 to connect one or more networks 1220 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102 and/or the server 112 further includes a color data module 1324, which may comprise processor-executable instructions stored in storage 1308 to be executed by controller(s)/processor(s) 1304 (e.g., software, firmware), hardware, or some combination thereof. For example, components of the color data module 1324 may be part of a software application running in the foreground and/or background on the device 102. The color data module 1324 may control the device 102 and/or server 112 as discussed above, for example with regard to FIGS. 1A, 1B, 4A-4C, 6, 10 and/or 11. Some or all of the controllers/modules of the color data module 1324 may be executable instructions that may be embedded in hardware or firmware in addition to, or instead of, software. In one embodiment, the computing device 102 may operate using an Android® operating system (such as Android® 4.3 Jelly Bean, Android® 4.4 KitKat or the like).

Executable instructions for operating the device 102 and/or server 112 and their various components may be executed by the controller(s)/processor(s) 1304, using the memory 1306 as temporary "working" storage at runtime. The executable instructions may be stored in a non-transitory manner in non-volatile memory 1306, storage 1308, or an external device. Alternatively, some or all of the executable instructions may be embedded in hardware or firmware in addition to or instead of software.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of reducing color distortion, the method being performed by a computing device having at least one processor and at least one memory, the method comprising:
    receiving first image data in a Red-Green-Blue (RGB) format;
    converting the first image data from the RGB format to a Luminance-Chrominance (YUV) format to generate second image data;
    comparing luminance values for adjacent pixel locations in the second image data;
    determining a first pixel location within the second image data, wherein determining the first pixel location comprises determining that a difference in luminance value between the first pixel location and an adjacent pixel location is above a threshold;
    determining a first color value for the first pixel location;
    determining a first modified color value, the first modified color value being lower than the first color value;
    determining a first luminance value for the first pixel location;
    determining a second luminance value, the second luminance value being greater than the first luminance value;
    generating third image data, the third image data including the first modified color value and the second luminance value for the first pixel location; and
    outputting the third image data to a remote device.

2. The computer-implemented method of claim 1, further comprising:
    detecting text within the second image data;
    determining a second pixel location is associated with the text;
    determining a second color value for the second pixel location;
    determining a second modified color value, the second modified color value being lower than the second color value;
    determining a third luminance value for the second pixel location; and
    determining a fourth luminance value, the fourth luminance value being greater than the third luminance value,
    wherein the third image data includes the second modified color value and the fourth luminance value for the second pixel location.

3. The computer-implemented method of claim 1, wherein the determining first modified color data further comprises:
    determining a normalized color value from the first color value by subtracting 128 from the first color value;
    determining a scaled color value from the normalized color value by multiplying the normalized color value by a correction factor, wherein the correction factor is a value between zero and one and determines an amount of desaturation; and
    determining an adjusted color value from the scaled color value by adding 128 to the scaled color value.

4. The computer-implemented method of claim 3, further comprising:
    determining a number of edge pixel locations within an area surrounding the first pixel location, a difference between each of the number of edge pixel locations and an adjacent pixel location being above the threshold;
    calculating a first exponent, the first exponent being a reciprocal of the number of edge pixel locations:
    selecting a first constant having a value between zero and one, the first constant selected based on an amount of desaturation; and
    determining the correction factor by raising the first constant to the first exponent.

5. A computer-implemented method, the method being performed by a computing device having at least one processor and at least one memory, the method comprising:
    receiving first image data in a luminance-chrominance (YUV) format;
    detecting an edge of an object included within the first image data, where detecting the edge comprises detecting a variation in at least one of luminance values and chrominance values between pixels;
    determining a plurality of first pixels associated with the edge;
    determining a first modified color value from a first original color value for a first pixel of the plurality of first pixels, the first modified color value being lower than the first original color value; and generating second image data from the first image data, the second image data including the first modified color value.

6. The computer-implemented method of claim 5, further comprising:
determining a second luminance value from a first luminance value for the first pixel, the second luminance value being greater than the first luminance value.

7. The computer-implemented method of claim 5, further comprising:
detecting text within the second image data;
determining a plurality of second pixels associated with the text; and
determining a second modified color value from a second original color value for each of the plurality of second pixels, the second modified color value being lower than the second original color value for each of the plurality of second pixels.

8. The computer-implemented method of claim 5, wherein the determining first modified color data further comprises:
identifying the first original color value of the first pixel;
determining a normalized color value from the first original color value by subtracting a first constant, the first constant being an average color value of the plurality of first pixels;
determining a scaled color value by multiplying the normalized color value by a correction factor, wherein the correction factor is a value between zero and one and determines an amount of desaturation; and
determining the first modified color value by adding the first constant to the scaled color value.

9. The computer-implemented method of claim 8, further comprising:
determining a number of edge pixels, the edge pixels corresponding to a portion of the plurality of first pixels within an area surrounding the first pixel;
calculating a first exponent, the first exponent being a reciprocal of the number of edge pixels;
selecting a first constant having a value between zero and one, the first constant selected based on an amount of desaturation; and
determining the correction factor by raising the first constant to the first exponent.

10. The computer-implemented method of claim 5, wherein the detecting further comprises:
identifying a first luminance value of the first pixel;
identifying a second luminance value of a second pixel in the first image data, the second pixel adjacent to the first pixel;
determining a difference between the first luminance value and the second luminance value;
determining that the difference exceeds a threshold; and
associating the first pixel and the second pixel with the edge.

11. The computer-implemented method of claim 5, further comprising:
receiving image data in an RGB format;
determining the first image data from the image data; and
transmitting the second image data to a remote device.

12. The computer-implemented method of claim 5, further comprising:
receiving the first image data from a remote device; and
displaying the second image data on a display.

13. A device, comprising:
at least one processor; and
at least one memory including instructions stored in a non-transitory storage medium, the instructions operable to be executed by the at least one processor to cause the device to:
receive first image data in a luminance-chrominance (YUV) format;
detect an edge of an object included within the first image data, where detecting the edge comprises detecting a variation in at least one of luminance values and chrominance values between pixels;
determine a plurality of first pixels associated with the edge;
determine a first modified color value from a first original color value for a first pixel of the plurality of first pixels, the first modified color value being lower than the first original color value; and
generate second image data from the first image data, the second image data including the first modified color value.

14. The device of claim 13, wherein the instructions further configure the system to:
determine a second luminance value from a first luminance value for the first pixel, the second luminance value being greater than the first luminance value.

15. The device of claim 13, wherein the instructions further configure the system to:
detect text within the second image data;
determine a plurality of second pixels associated with the text; and
determine a second modified color value from a second original color value for each of the plurality of second pixels, the second modified color value being lower than the second original color value for each of the plurality of second pixels.

16. The device of claim 13, wherein the instructions further configure the system to:
identify the first original color value of the first pixel;
determine a normalized color value from the first original color value by subtracting a first constant, the first constant being an average color value of the plurality of first pixels;
determine a scaled color value by multiplying the normalized color value by a correction factor, wherein the correction factor is a value between zero and one and determines an amount of desaturation; and
determine the first modified color value by adding the first constant to the scaled color value.

17. The device of claim 16, wherein the instructions further configure the system to:
determine a number of edge pixels, the edge pixels corresponding to a portion of the plurality of first pixels within an area surrounding the first pixel;
calculate a first exponent, the first exponent being a reciprocal of the number of edge pixels;
select a first constant having a value between zero and one, the first constant selected based on an amount of desaturation; and
determine the correction factor by raising the first constant to the first exponent.

18. The device of claim 13, wherein the instructions further configure the system to:
identify a first luminance value of the first pixel;
identify a second luminance value of a second pixel in the first image data, the second pixel adjacent to the first pixel;
determine a difference between the first luminance value and the second luminance value;

determine that the difference exceeds a threshold; and associate the first pixel and the second pixel with the edge.

19. The device of claim 13, wherein the instructions further configure the system to:

receive image data in an RGB format;

determine the first image data from the image data; and transmit the second image data to a remote device.

20. The device of claim 13, wherein the instructions further configure the system to:

receive the first image data from a remote device; and display the second image data on a display.

* * * * *